(12) United States Patent
Rawlings

(10) Patent No.: US 9,333,917 B2
(45) Date of Patent: May 10, 2016

(54) EXTERIOR MIRROR WITH SPOTTER MIRROR

(71) Applicant: MAGNA MIRRORS OF AMERICA, INC., Holland, MI (US)

(72) Inventor: Donald S. Rawlings, Caledonia, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 44 days.

(21) Appl. No.: 14/282,030

(22) Filed: May 20, 2014

(65) Prior Publication Data

US 2014/0254015 A1   Sep. 11, 2014

Related U.S. Application Data

(63) Continuation of application No. 13/628,783, filed on Sep. 27, 2012, now Pat. No. 8,736,940.

(60) Provisional application No. 61/568,282, filed on Dec. 8, 2011, provisional application No. 61/541,575, filed on Sep. 30, 2011.

(51) Int. Cl.
| | |
|---|---|
| *G02F 1/153* | (2006.01) |
| *B60R 1/06* | (2006.01) |
| *B60R 1/08* | (2006.01) |
| *G02F 1/161* | (2006.01) |

(52) U.S. Cl.
CPC ............. *B60R 1/0602* (2013.01); *B60R 1/082* (2013.01); *B60R 1/088* (2013.01); *G02F 1/1533* (2013.01); *G02F 1/161* (2013.01); *G02F 2201/34* (2013.01)

(58) Field of Classification Search
CPC ............ B60R 1/088; B60R 1/082; B60R 1/08
USPC ................. 359/265–274, 857–866, 868, 869, 359/871–881
See application file for complete search history.

(56) References Cited

U.S. PATENT DOCUMENTS

| | | |
|---|---|---|
| 1,114,559 A | 10/1914 | Weed |
| 1,401,942 A | 12/1921 | Benzer |
| 1,672,559 A | 6/1928 | Doble |

(Continued)

FOREIGN PATENT DOCUMENTS

| | | |
|---|---|---|
| CN | 3336405 | 9/2003 |
| CN | 3336407 | 9/2003 |

(Continued)

*Primary Examiner* — Mahidere Sahle
(74) *Attorney, Agent, or Firm* — Gardner, Linn, Burkhart & Flory, LLP

(57) ABSTRACT

An exterior rearview mirror assembly for a vehicle includes a principal reflective element, a wide angle auxiliary reflective element and a back plate. The principal reflective element is disposed at a principal reflective element region of the back plate and has a cutout at a corner region thereof. The wide angle auxiliary reflective element is disposed at the auxiliary reflective element region of the back plate and is adjacent to the principal reflective element at the corner region of the principal reflective element. A single heater pad is disposed between the principal reflective element and the principal reflective element region of the back plate and between the wide angle auxiliary reflective element and the auxiliary reflective element region of the back plate. When powered, the single heater pad heats the principal reflective element and the wide angle auxiliary reflective element.

20 Claims, 5 Drawing Sheets

(56) References Cited

U.S. PATENT DOCUMENTS

| | | |
|---|---|---|
| RE17,274 E | 4/1929 | Porter |
| 1,771,061 A | 7/1930 | Rice |
| 2,135,262 A | 11/1938 | Schumacher |
| 2,263,382 A | 11/1941 | Gotzinger |
| 2,514,989 A | 7/1950 | Buren |
| 2,580,014 A | 12/1951 | Gazda |
| 2,636,419 A | 4/1953 | Kerr |
| 2,763,187 A | 9/1956 | Wiener |
| 2,778,273 A | 1/1957 | Fellmeth |
| 2,911,177 A | 11/1959 | West |
| 3,104,274 A | 9/1963 | King |
| 3,131,250 A | 4/1964 | Ely |
| 3,146,296 A | 8/1964 | Fischer |
| 3,170,985 A | 2/1965 | Katulich |
| 3,175,463 A | 3/1965 | Seashore |
| 3,266,016 A | 8/1966 | Maruyama et al. |
| 3,267,806 A | 8/1966 | Azegami |
| 3,280,701 A | 10/1966 | Donnelly et al. |
| 3,337,285 A | 8/1967 | Travis |
| 3,338,655 A | 8/1967 | Young |
| 3,375,053 A | 3/1968 | Ward |
| 3,389,952 A | 6/1968 | Tobin, Jr. |
| 3,404,935 A | 10/1968 | Creager |
| 3,408,136 A | 10/1968 | Travis |
| 3,424,517 A | 1/1969 | Budreck |
| 3,563,638 A | 2/1971 | Panozzo |
| 3,601,614 A | 8/1971 | Platzer |
| 3,610,739 A | 10/1971 | Seashore |
| 3,667,833 A | 6/1972 | Baldwin, Sr. |
| 3,708,222 A | 1/1973 | Stern |
| 3,764,201 A | 10/1973 | Haile |
| 3,806,232 A | 4/1974 | Gray |
| 3,826,563 A | 7/1974 | Davis |
| 3,881,811 A | 5/1975 | French |
| 3,909,117 A | 9/1975 | Takahashi et al. |
| 3,972,601 A | 8/1976 | Johnson |
| 4,200,359 A | 4/1980 | Lawson |
| 4,223,983 A | 9/1980 | Bloom |
| 4,258,979 A | 3/1981 | Mahin |
| 4,264,144 A | 4/1981 | McCord |
| 4,268,120 A | 5/1981 | Jitsumori |
| 4,281,899 A | 8/1981 | Oskam |
| 4,293,191 A | 10/1981 | Kim |
| 4,303,308 A | 12/1981 | Kobrin |
| 4,306,770 A | 12/1981 | Marhauer |
| 4,311,362 A | 1/1982 | LaPorte |
| 4,311,363 A | 1/1982 | Marsalka et al. |
| 4,325,609 A | 4/1982 | Alford |
| 4,331,382 A | 5/1982 | Graff |
| 4,350,412 A | 9/1982 | Steenblik et al. |
| 4,435,042 A | 3/1984 | Wood et al. |
| 4,436,371 A | 3/1984 | Wood et al. |
| 4,436,372 A | 3/1984 | Schmidt et al. |
| 4,439,013 A | 3/1984 | Hagn et al. |
| 4,449,786 A | 5/1984 | McCord |
| 4,470,665 A | 9/1984 | Blom |
| 4,499,451 A | 2/1985 | Suzuki et al. |
| 4,526,446 A | 7/1985 | Adams |
| 4,549,786 A | 10/1985 | Albers et al. |
| 4,555,166 A | 11/1985 | Enomoto |
| 4,575,202 A | 3/1986 | McGuire |
| 4,588,267 A | 5/1986 | Pastore |
| 4,609,266 A | 9/1986 | Blom |
| 4,623,222 A | 11/1986 | Itoh et al. |
| 4,629,296 A | 12/1986 | White |
| 4,630,904 A | 12/1986 | Pastore |
| 4,674,849 A | 6/1987 | Stewart |
| 4,674,850 A | 6/1987 | Blom |
| 4,678,294 A | 7/1987 | Van Nostrand |
| 4,679,906 A | 7/1987 | Brandenburg |
| 4,712,879 A | 12/1987 | Lynam et al. |
| 4,715,701 A | 12/1987 | Urban |
| 4,721,364 A | 1/1988 | Itoh et al. |
| 4,727,302 A | 2/1988 | Mizuta et al. |
| 4,733,336 A | 3/1988 | Skogler et al. |
| 4,770,522 A | 9/1988 | Alten |
| 4,773,740 A | 9/1988 | Kawakami et al. |
| D297,926 S | 10/1988 | Kesler |
| 4,793,690 A | 12/1988 | Gahan et al. |
| 4,799,768 A | 1/1989 | Gahan |
| 4,824,231 A | 4/1989 | Quintana |
| 4,826,289 A | 5/1989 | Vandenbrink et al. |
| 4,828,379 A | 5/1989 | Parsons et al. |
| 4,834,521 A | 5/1989 | Dubs |
| 4,853,283 A | 8/1989 | Skolnick |
| 4,859,046 A | 8/1989 | Traynor et al. |
| 4,882,466 A | 11/1989 | Friel |
| 4,882,565 A | 11/1989 | Gallmeyer |
| 4,906,075 A | 3/1990 | Matsumiya |
| 4,906,085 A | 3/1990 | Sugihara et al. |
| 4,913,542 A | 4/1990 | Adolfsson |
| 4,917,485 A | 4/1990 | Baldwin, Sr. |
| 4,929,074 A | 5/1990 | Urban |
| 4,932,769 A | 6/1990 | Goosen |
| 4,932,770 A | 6/1990 | Caravaty |
| 4,948,242 A | 8/1990 | Desmond et al. |
| 4,989,964 A | 2/1991 | Meise |
| 5,005,962 A | 4/1991 | Edelman |
| 5,014,167 A | 5/1991 | Roberts |
| 5,022,747 A | 6/1991 | Polanyi et al. |
| 5,033,835 A | 7/1991 | Platzer, Jr. |
| 5,044,739 A | 9/1991 | do Espirito Santo |
| 5,050,977 A | 9/1991 | Platzer, Jr. |
| 5,052,792 A | 10/1991 | McDonough |
| 5,066,112 A | 11/1991 | Lynam et al. |
| 5,073,012 A | 12/1991 | Lynam |
| 5,076,673 A | 12/1991 | Lynam et al. |
| 5,078,480 A | 1/1992 | Warszawski |
| 5,080,492 A | 1/1992 | Platzer, Jr. |
| 5,107,374 A | 4/1992 | Lupo et al. |
| 5,115,346 A | 5/1992 | Lynam |
| 5,115,352 A | 5/1992 | do Espirito Santo |
| 5,117,346 A | 5/1992 | Gard |
| 5,118,540 A | 6/1992 | Hutchison |
| 5,140,455 A | 8/1992 | Varaprasad et al. |
| 5,142,407 A | 8/1992 | Varaprasad et al. |
| 5,151,816 A | 9/1992 | Varaprasad et al. |
| 5,151,824 A | 9/1992 | O'Farrell |
| 5,166,833 A | 11/1992 | Shyu |
| 5,178,448 A | 1/1993 | Adams et al. |
| 5,179,471 A | 1/1993 | Caskey et al. |
| 5,183,099 A | 2/1993 | Bechu |
| 5,189,537 A | 2/1993 | O'Farrell |
| 5,193,029 A | 3/1993 | Schofield et al. |
| 5,207,492 A | 5/1993 | Roberts |
| 5,225,943 A | 7/1993 | Lupo |
| 5,233,461 A | 8/1993 | Dornan et al. |
| 5,237,458 A | 8/1993 | Polanyi et al. |
| 5,237,459 A | 8/1993 | Strauss |
| 5,239,405 A | 8/1993 | Varaprasad et al. |
| 5,247,395 A | 9/1993 | Martinez |
| 5,253,109 A | 10/1993 | O'Farrell et al. |
| 5,285,060 A | 2/1994 | Larson et al. |
| 5,295,021 A | 3/1994 | Swanson |
| 5,296,973 A | 3/1994 | Burke |
| 5,313,335 A | 5/1994 | Gray et al. |
| 5,327,288 A | 7/1994 | Wellington et al. |
| 5,354,965 A | 10/1994 | Lee |
| 5,355,245 A | 10/1994 | Lynam |
| 5,371,659 A | 12/1994 | Pastrick et al. |
| 5,406,414 A | 4/1995 | O'Farrell et al. |
| 5,412,512 A | 5/1995 | Zebold et al. |
| 5,424,875 A | 6/1995 | Davis, II |
| 5,432,643 A | 7/1995 | Huang |
| 5,437,931 A | 8/1995 | Tsai et al. |
| 5,446,576 A | 8/1995 | Lynam et al. |
| 5,448,397 A | 9/1995 | Tonar |
| 5,479,297 A | 12/1995 | Summers |
| 5,481,409 A | 1/1996 | Roberts |
| 5,497,305 A | 3/1996 | Pastrick et al. |
| 5,497,306 A | 3/1996 | Pastrick |
| 5,509,606 A | 4/1996 | Breithaupt et al. |
| 5,517,003 A | 5/1996 | Kadooka et al. |
| 5,517,367 A | 5/1996 | Kim et al. |

(56) References Cited

U.S. PATENT DOCUMENTS

| | | |
|---|---|---|
| 5,523,877 A | 6/1996 | Lynam |
| 5,525,264 A | 6/1996 | Cronin et al. |
| 5,526,195 A | 6/1996 | Thomas |
| 5,530,588 A | 6/1996 | Vivier |
| 5,535,056 A | 7/1996 | Caskey et al. |
| 5,550,677 A | 8/1996 | Schofield et al. |
| 5,557,467 A | 9/1996 | McColgan et al. |
| 5,559,640 A | 9/1996 | Vachss et al. |
| 5,563,744 A | 10/1996 | Matsumiya |
| 5,567,360 A | 10/1996 | Varaprasad et al. |
| 5,575,552 A | 11/1996 | Faloon et al. |
| 5,579,133 A | 11/1996 | Black et al. |
| 5,587,236 A | 12/1996 | Agrawal et al. |
| 5,587,699 A | 12/1996 | Faloon et al. |
| 5,594,222 A | 1/1997 | Caldwell |
| 5,594,593 A | 1/1997 | Milner |
| 5,610,756 A | 3/1997 | Lynam et al. |
| 5,621,569 A | 4/1997 | Schlenke |
| 5,621,577 A | 4/1997 | Lang et al. |
| 5,644,442 A | 7/1997 | Lemere |
| 5,649,756 A | 7/1997 | Adams et al. |
| 5,668,663 A | 9/1997 | Varaprasad et al. |
| 5,669,698 A | 9/1997 | Veldman et al. |
| 5,669,699 A | 9/1997 | Pastrick et al. |
| 5,669,704 A | 9/1997 | Pastrick |
| 5,669,705 A | 9/1997 | Pastrick et al. |
| 5,670,935 A | 9/1997 | Schofield et al. |
| 5,689,370 A | 11/1997 | Tonar et al. |
| 5,691,855 A | 11/1997 | Lupkas |
| 5,715,093 A | 2/1998 | Schierbeek et al. |
| 5,722,836 A | 3/1998 | Younker |
| 5,724,187 A | 3/1998 | Varaprasad et al. |
| 5,751,489 A | 5/1998 | Caskey et al. |
| 5,760,962 A | 6/1998 | Schofield et al. |
| 5,784,211 A | 7/1998 | Mingledorff |
| 5,786,772 A | 7/1998 | Schofield et al. |
| 5,788,357 A | 8/1998 | Muth et al. |
| 5,790,298 A | 8/1998 | Tonar |
| 5,790,327 A | 8/1998 | Lee et al. |
| 5,793,542 A | 8/1998 | Kondo et al. |
| 5,796,094 A | 8/1998 | Schofield et al. |
| 5,796,532 A | 8/1998 | Kanazawa |
| 5,803,579 A | 9/1998 | Turnbull et al. |
| 5,805,367 A | 9/1998 | Kanazawa |
| 5,808,777 A | 9/1998 | Lynam et al. |
| 5,823,654 A | 10/1998 | Pastrick et al. |
| 5,825,527 A | 10/1998 | Forgette et al. |
| 5,835,294 A | 11/1998 | Minegishi |
| 5,838,505 A | 11/1998 | Palathingal |
| 5,847,889 A | 12/1998 | Komiyama et al. |
| 5,863,116 A | 1/1999 | Pastrick et al. |
| 5,864,434 A | 1/1999 | Taylor |
| 5,877,897 A | 3/1999 | Schofield et al. |
| 5,910,854 A | 6/1999 | Varaprasad et al. |
| 5,922,176 A | 7/1999 | Caskey |
| 5,923,457 A | 7/1999 | Byker et al. |
| 5,929,786 A | 7/1999 | Schofield et al. |
| 5,938,320 A | 8/1999 | Crandall |
| 5,980,050 A | 11/1999 | McCord |
| 6,001,486 A | 12/1999 | Varaprasad et al. |
| 6,002,511 A | 12/1999 | Varaprasad et al. |
| 6,005,724 A | 12/1999 | Todd |
| 6,007,207 A | 12/1999 | Liu |
| 6,030,084 A | 2/2000 | Schmidt |
| 6,032,323 A | 3/2000 | Smith et al. |
| 6,033,078 A | 3/2000 | Su et al. |
| 6,065,840 A | 5/2000 | Caskey et al. |
| 6,074,068 A | 6/2000 | Palathingal |
| 6,076,934 A | 6/2000 | Gerdes |
| 6,097,023 A | 8/2000 | Schofield et al. |
| 6,102,546 A | 8/2000 | Carter |
| 6,109,586 A | 8/2000 | Hock |
| 6,111,684 A | 8/2000 | Forgette et al. |
| 6,116,743 A | 9/2000 | Hoek |
| 6,124,647 A | 9/2000 | Marcus et al. |
| 6,132,072 A | 10/2000 | Turnbull et al. |
| 6,154,306 A | 11/2000 | Varaprasad et al. |
| 6,164,564 A | 12/2000 | Franco et al. |
| 6,170,956 B1 | 1/2001 | Rumsey et al. |
| 6,172,613 B1 | 1/2001 | DeLine et al. |
| 6,176,602 B1 | 1/2001 | Pastrick et al. |
| 6,178,034 B1 | 1/2001 | Allemand et al. |
| 6,195,194 B1 | 2/2001 | Roberts et al. |
| 6,196,688 B1 | 3/2001 | Caskey et al. |
| 6,198,409 B1 | 3/2001 | Schofield et al. |
| 6,199,993 B1 | 3/2001 | Mou |
| 6,201,642 B1 | 3/2001 | Bos |
| 6,207,083 B1 | 3/2001 | Varaprasad et al. |
| 6,227,689 B1 | 5/2001 | Miller |
| 6,229,435 B1 | 5/2001 | Knapp et al. |
| 6,239,898 B1 | 5/2001 | Byker et al. |
| 6,244,716 B1 | 6/2001 | Steenwyk et al. |
| 6,245,262 B1 | 6/2001 | Varaprasad et al. |
| 6,250,148 B1 | 6/2001 | Lynam |
| 6,257,746 B1 | 7/2001 | Todd et al. |
| 6,260,608 B1 | 7/2001 | Kim |
| 6,270,225 B1 | 8/2001 | Goolsby |
| 6,276,821 B1 | 8/2001 | Pastrick et al. |
| 6,286,965 B1 | 9/2001 | Caskey et al. |
| 6,294,989 B1 | 9/2001 | Schofield et al. |
| 6,310,611 B1 | 10/2001 | Caldwell |
| 6,315,419 B1 | 11/2001 | Platzer, Jr. |
| 6,318,870 B1 | 11/2001 | Spooner et al. |
| 6,320,282 B1 | 11/2001 | Caldwell |
| 6,329,925 B1 | 12/2001 | Skiver et al. |
| 6,335,548 B1 | 1/2002 | Roberts et al. |
| 6,341,523 B2 | 1/2002 | Lynam |
| 6,343,402 B1 | 2/2002 | Smith et al. |
| 6,356,376 B1 | 3/2002 | Tonar et al. |
| 6,359,274 B1 | 3/2002 | Nixon et al. |
| 6,379,013 B1 | 4/2002 | Bechtel et al. |
| 6,390,632 B1 | 5/2002 | Palathingal |
| 6,396,397 B1 | 5/2002 | Bos et al. |
| 6,398,377 B1 | 6/2002 | Chou |
| 6,402,328 B1 | 6/2002 | Bechtel et al. |
| 6,420,036 B1 | 7/2002 | Varaprasad et al. |
| 6,420,684 B2 | 7/2002 | Higgins |
| 6,426,485 B1 | 7/2002 | Bulgajewski et al. |
| 6,428,172 B1 | 8/2002 | Hutzel et al. |
| 6,441,943 B1 | 8/2002 | Roberts et al. |
| 6,441,964 B1 | 8/2002 | Chu et al. |
| 6,445,287 B1 | 9/2002 | Schofield et al. |
| 6,449,082 B1 | 9/2002 | Agrawal et al. |
| 6,471,362 B1 | 10/2002 | Carter et al. |
| 6,472,979 B2 | 10/2002 | Schofield et al. |
| 6,498,620 B2 | 12/2002 | Schofield et al. |
| 6,501,387 B2 | 12/2002 | Skiver et al. |
| 6,504,142 B2 | 1/2003 | Nixon et al. |
| 6,511,192 B1 | 1/2003 | Henion et al. |
| 6,512,624 B2 | 1/2003 | Tonar et al. |
| 6,521,916 B2 | 2/2003 | Roberts et al. |
| 6,522,451 B1 | 2/2003 | Lynam |
| 6,523,965 B2 | 2/2003 | Luger |
| 6,523,976 B1 | 2/2003 | Turnbull et al. |
| 6,537,138 B2 | 3/2003 | Ohmori et al. |
| 6,582,109 B2 | 6/2003 | Miller |
| 6,595,649 B2 | 7/2003 | Hoekstra et al. |
| 6,615,438 B1 | 9/2003 | Franco |
| 6,627,918 B2 | 9/2003 | Getz et al. |
| 6,642,851 B2 | 11/2003 | DeLine et al. |
| 6,648,477 B2 | 11/2003 | Hutzel et al. |
| 6,669,109 B2 | 12/2003 | Ivanov et al. |
| 6,690,268 B2 | 2/2004 | Schofield et al. |
| 6,717,610 B1 | 4/2004 | Bos et al. |
| 6,717,712 B2 | 4/2004 | Lynam et al. |
| 6,719,215 B2 | 4/2004 | Drouillard |
| 6,731,205 B2 | 5/2004 | Schofield et al. |
| 6,737,629 B2 | 5/2004 | Nixon et al. |
| 6,742,904 B2 | 6/2004 | Bechtel et al. |
| 6,757,109 B2 | 6/2004 | Bos |
| D493,131 S | 7/2004 | Lawlor et al. |
| D493,394 S | 7/2004 | Lawlor et al. |
| 6,824,281 B2 | 11/2004 | Schofield et al. |
| 6,831,268 B2 | 12/2004 | Bechtel et al. |

(56) References Cited

U.S. PATENT DOCUMENTS

| | | |
|---|---|---|
| 6,882,287 B2 | 4/2005 | Schofield |
| 6,919,796 B2 | 7/2005 | Boddy et al. |
| 6,932,483 B2 | 8/2005 | Strumolo et al. |
| 6,979,090 B1 | 12/2005 | Wnuk |
| 7,001,032 B2 | 2/2006 | Lo |
| 7,005,974 B2 | 2/2006 | McMahon et al. |
| 7,025,469 B1 | 4/2006 | Manfre' et al. |
| 7,038,577 B2 | 5/2006 | Pawlicki et al. |
| 7,080,913 B2 | 7/2006 | Henion et al. |
| 7,097,312 B2 | 8/2006 | Platzer, Jr. |
| 7,106,392 B2 | 9/2006 | You |
| 7,126,456 B2 | 10/2006 | Boddy et al. |
| 7,156,532 B2 | 1/2007 | Stonecypher |
| 7,167,294 B2 | 1/2007 | Lynam et al. |
| 7,168,830 B2 | 1/2007 | Pastrick et al. |
| 7,184,190 B2 | 2/2007 | McCabe et al. |
| 7,195,381 B2 | 3/2007 | Lynam et al. |
| 7,202,445 B2 | 4/2007 | Yamada |
| 7,230,207 B2 | 6/2007 | Witzke et al. |
| 7,249,860 B2 | 7/2007 | Kulas et al. |
| 7,255,451 B2 | 8/2007 | McCabe et al. |
| 7,267,448 B2 | 9/2007 | Schmidt et al. |
| 7,274,501 B2 | 9/2007 | McCabe et al. |
| 7,289,037 B2 | 10/2007 | Uken et al. |
| 7,306,355 B2 | 12/2007 | Walser et al. |
| 7,324,261 B2 | 1/2008 | Tonar et al. |
| 7,338,177 B2 | 3/2008 | Lynam |
| 7,339,149 B1 | 3/2008 | Schofield et al. |
| 7,342,707 B2 | 3/2008 | Roberts et al. |
| 7,345,680 B2 | 3/2008 | David |
| 7,349,143 B2 | 3/2008 | Tonar et al. |
| 7,360,932 B2 | 4/2008 | Uken et al. |
| 7,370,983 B2 | 5/2008 | DeWind et al. |
| 7,377,675 B2 | 5/2008 | Pastrick et al. |
| 7,391,563 B2 | 6/2008 | McCabe et al. |
| 7,400,435 B2 | 7/2008 | Byers et al. |
| 7,420,756 B2 | 9/2008 | Lynam |
| 7,423,522 B2 | 9/2008 | O'Brien et al. |
| 7,448,764 B2 | 11/2008 | Platzer, Jr. |
| 7,492,281 B2 | 2/2009 | Lynam et al. |
| 7,517,099 B2 | 4/2009 | Hannah |
| 7,526,103 B2 | 4/2009 | Schofield et al. |
| 7,581,859 B2 | 9/2009 | Lynam |
| 7,626,749 B2 | 12/2009 | Baur et al. |
| 7,636,188 B2 | 12/2009 | Baur et al. |
| 7,748,856 B2 | 7/2010 | Zhao |
| 7,824,045 B2 | 11/2010 | Zhao |
| 7,857,469 B2 | 12/2010 | Sinelli et al. |
| 7,864,400 B1 | 1/2011 | Cammenga et al. |
| 7,887,204 B2 | 2/2011 | Zhao |
| 7,934,844 B1 | 5/2011 | Zhao |
| 7,965,336 B2 | 6/2011 | Bingle et al. |
| 7,967,458 B2 | 6/2011 | Karpus et al. |
| 8,021,005 B2 | 9/2011 | Zhao |
| 8,058,977 B2 | 11/2011 | Lynam |
| 8,061,859 B1 | 11/2011 | Zhao |
| 8,267,535 B2 | 9/2012 | Zhao |
| 8,736,940 B2 | 5/2014 | Rawlings |
| 2002/0036828 A1 | 3/2002 | Wong |
| 2002/0105741 A1 | 8/2002 | Platzer, Jr. |
| 2002/0159169 A1 | 10/2002 | McCord |
| 2002/0159270 A1 | 10/2002 | Lynam et al. |
| 2003/0039039 A1 | 2/2003 | Thomas et al. |
| 2003/0043589 A1 | 3/2003 | Blank |
| 2003/0117731 A1 | 6/2003 | Platzer, Jr. |
| 2004/0032638 A1 | 2/2004 | Tonar et al. |
| 2004/0032675 A1 | 2/2004 | Weller et al. |
| 2004/0032676 A1 | 2/2004 | Drummond et al. |
| 2004/0114260 A1 | 6/2004 | Bartnick |
| 2004/0165291 A1 | 8/2004 | Platzer, Jr. |
| 2004/0257685 A1 | 12/2004 | Minor et al. |
| 2004/0264011 A1 | 12/2004 | Lynam |
| 2005/0078389 A1 | 4/2005 | Kulas et al. |
| 2005/0083577 A1 | 4/2005 | Varaprasad et al. |
| 2005/0099693 A1 | 5/2005 | Schofield et al. |
| 2005/0134983 A1 | 6/2005 | Lynam |
| 2005/0232469 A1 | 10/2005 | Schofield et al. |
| 2005/0248859 A1 | 11/2005 | Platzer, Jr. |
| 2006/0050018 A1 | 3/2006 | Hutzel et al. |
| 2006/0061008 A1 | 3/2006 | Karner et al. |
| 2006/0125919 A1 | 6/2006 | Camilleri et al. |
| 2006/0126150 A1 | 6/2006 | Tonar et al. |
| 2006/0171704 A1 | 8/2006 | Bingle et al. |
| 2006/0184297 A1 | 8/2006 | Higgins-Luthman |
| 2006/0268440 A1 | 11/2006 | Platzer, Jr. |
| 2006/0279863 A1 | 12/2006 | Starbuck |
| 2007/0058257 A1 | 3/2007 | Lynam |
| 2007/0285789 A1 | 12/2007 | Lindahl et al. |
| 2008/0212189 A1 | 9/2008 | Baur et al. |
| 2008/0225421 A1 | 9/2008 | Platzer |
| 2008/0304170 A1 | 12/2008 | Zhao |
| 2009/0040306 A1 | 2/2009 | Foote et al. |
| 2009/0115631 A1 | 5/2009 | Foote et al. |
| 2009/0213481 A1 | 8/2009 | Wilson |
| 2009/0237820 A1 | 9/2009 | McCabe et al. |
| 2010/0039691 A1 | 2/2010 | Thomas et al. |
| 2010/0195228 A1 | 8/2010 | Sinelli et al. |
| 2010/0197203 A1 | 8/2010 | Wilson et al. |
| 2010/0315732 A1 | 12/2010 | Henion et al. |
| 2010/0321757 A1 | 12/2010 | Cammenga et al. |
| 2011/0194185 A1 | 8/2011 | Cammenga et al. |
| 2011/0299170 A1 | 12/2011 | Harlow et al. |
| 2013/0083388 A1 | 4/2013 | Rawlings |

FOREIGN PATENT DOCUMENTS

| | | |
|---|---|---|
| DE | 2409748 | 9/1975 |
| DE | 2550095 | 5/1976 |
| DE | 2647592 | 4/1978 |
| DE | 2915521 | 10/1980 |
| DE | 3302735 | 8/1984 |
| DE | 3329998 | 3/1985 |
| DE | 3606020 | 8/1987 |
| DE | 3620228 | 12/1987 |
| DE | 3624321 | 2/1988 |
| DE | 3743072 | 7/1989 |
| DE | 4026578 | 4/1992 |
| EP | 0210757 | 2/1987 |
| EP | 0310261 | 4/1989 |
| EP | 0356099 | 2/1990 |
| EP | 0551802 | 1/1992 |
| EP | 0728618 | 8/1996 |
| EP | 0729864 | 9/1996 |
| EP | 0791503 | 8/1997 |
| EP | 0917987 | 5/1999 |
| FR | 2628042 | 3/1988 |
| GB | 1279158 | 6/1972 |
| GB | 2048189 | 12/1980 |
| GB | 2092534 | 8/1982 |
| JP | 55076721 | 10/1980 |
| JP | 362075619 | 4/1987 |
| JP | 62105103 | 5/1987 |
| JP | 1186443 | 7/1989 |
| JP | 1208245 | 8/1989 |
| JP | 491539 | 8/1992 |
| JP | 10086899 | 4/1998 |
| KR | 2002092059 | 12/2002 |
| NL | 7908257 | 6/1981 |
| TW | 24057 | 3/2001 |

EXTERIOR MIRROR WITH SPOTTER MIRROR

CROSS REFERENCE TO RELATED APPLICATIONS

The present application is a continuation of U.S. patent application Ser. No. 13/628,783, filed Sep. 27, 2012, now U.S. Pat. No. 8,736,940, which claims the filing benefit of U.S. provisional applications, Ser. No. 61/568,282, filed Dec. 8, 2011, and Ser. No. 61/541,575, filed Sep. 30, 2011, which are hereby incorporated herein by reference in their entireties.

FIELD OF THE INVENTION

The present invention relates generally to reflective element assemblies for rearview mirrors of vehicles and, more particularly, to electro-optic or electrochromic reflective element assemblies with a wide angle auxiliary mirror reflector or spotter mirror for vehicular exterior rearview mirror assemblies and a method for manufacturing such exterior electro-optic or electrochromic reflective element assemblies.

BACKGROUND OF THE INVENTION

Automotive electrochromic mirror reflective element cell assemblies typically include a front substrate and a rear substrate and an electrochromic medium sandwiched therebetween and contained within an interpane cavity. The substrates are shaped as desired by the automobile manufacturer for a particular mirror design or application. Reflective element assemblies for exterior rearview mirror assemblies may include an auxiliary wide angle or spotter mirror portion, such as the types described in U.S. Pat. Nos. 7,255,451; 7,195,381; 6,717,712; 7,126,456; 6,315,419; 7,097,312; 6,522,451; 6,315,419; 5,080,492; 5,050,977; and/or 5,033,835, which are hereby incorporated herein by reference in their entireties, and optionally may have an integrally formed auxiliary mirror reflector, such as the types described in U.S. Pat. Nos. 8,021,005; 7,934,844; 7,887,204; 7,824,045; and 7,748,856, which are hereby incorporated herein by reference in their entireties.

During manufacture and assembly of an electrochromic reflective element cell, the desired shape of the respective front and rear substrates are typically scribed (using the likes of a diamond tipped scriber or the like) onto a larger flat or curved glass sheet or lite. Often, multiple shapes are scribed into a single large glass sheet, and, after the shapes have been scribed, individual cut shapes/substrates are broken out from the scribed glass sheet or lite in a known manner. Since breaking out of a shape is most efficient or effective where the breakout line does not have sharp or convoluted turns or radii, it is desirable that the front and rear cut shapes or substrates to be used in an electrochromic mirror cell not have sharp or convoluted corners or radii, and that they generally each be of comparable or similar size, shape and dimension. After breakout, the individual front and rear cut shapes or substrates are cleaned and coated with a conductive or semiconductive coating or coatings that are reflective or transparent.

After the substrates are coated, an uncured adhesive material, typically an uncured epoxy material (often containing spacer beads, such as glass beads or the like), is precision dispensed around the perimeter of one of the cut shapes or substrates, and the other cut shape or substrate is superimposed thereupon and spaced apart from the first cut shape by the dispensed perimeter material. The uncured adhesive material (i.e., the uncured seal) is then cured, such as by heating, to form a cured seal that adheres the shapes or substrates together and that spaces the substrates apart a desired or appropriate or selected amount to define and establish an appropriate interpane cavity spacing. The substrates, when so adhered together and interspaced apart by the cured seal, form an empty cell with an interpane cavity between the substrates and bounded by the perimeter cured seal. Next, an electrochromic medium, such as an electrochemichromic fluid or an electrochromic monomer composition, is filled into the cavity via an aperture (commonly known as a fill port or plug hole) provided in the cured perimeter seal during its dispensing. Filling is typically via a vacuum fill process (such as described in U.S. Pat. No. 5,140,455, which is hereby incorporated herein by reference in its entirety), and the fill port is plugged or sealed with a suitable plug material to complete the isolation of the electrochromic medium established in the interpane cavity of the reflective element or cell to protect against infiltration by outside air and against contamination by the likes of outside water or debris or the like.

SUMMARY OF THE INVENTION

The present invention provides a method of making automotive electrochromic reflective element cell for automotive exterior rearview mirror assemblies with auxiliary wide angle reflectors by providing a means for sealing the interpane cavity and providing a seal partially or substantially around an auxiliary wide angle reflector portion of the exterior reflective element cell in a manner that is conducive with and is suitable for vacuum backfilling of the interpane cavity during manufacture of the electrochromic reflective element. The seal partially around the auxiliary wide angle reflector portion further serves to at least partially and preferably substantially adjoin the respective substrates together at the auxiliary wide angle reflector portion and at least partially provides a barrier to ingress thereat of the likes of water and debris and the like, while still providing a potential drain path to allow for draining from the spotter portion cavity of water that may accumulate thereat during normal use of the electrochromic reflective element in an exterior sideview mirror assembly on a vehicle. The formed electrochromic mirror cells are shaped for utilization in a complete automotive electrochromic rearview mirror assembly, such as the types described in U.S. Pat. Nos. 7,748,856; 6,595,649; 6,648,477; 6,154,306; 5,610,756; 5,406,414; and/or 5,253,109, which are hereby incorporated herein by reference in their entireties.

According to an aspect of the present invention, a method of manufacturing a variable reflectance vehicular electro-optic rearview mirror reflective element includes providing a front substrate having a first surface that generally faces a driver of a vehicle equipped with a mirror assembly that incorporates the rearview mirror reflective element assembly. The front substrate has a second surface opposite the first surface and the second surface of the front substrate has a transparent electrically conductive coating disposed thereat. A curved recess is established at the second surface of the front substrate, and a reflector coating is established at the recess to provide an integral auxiliary wide angle reflector integrally formed with the front substrate. A rear substrate is provided that has a third surface and a fourth surface, with the third surface having a conductive coating disposed thereat (and optionally having a conductive metallic reflective coating disposed at the third surface). An uncured seal material or bead is dispensed at a perimeter edge region of one of the front and rear substrates. The uncured seal is dispensed partially around the recess at the second surface of the front substrate and traverses the recess area, whereby, when the substrates are joined together by the perimeter seal, the seal is cured and establishes the interpane cavity around the principal reflecting area or portion of the reflective element, with the wide angle reflector portion being outside of the sealed interpane cavity, and with the seal also substantially surrounding the wide angle reflector portion of the reflective element with a vent port established at an outboard perimeter region of the wide angle reflector portion. The seal is disposed around the perimeter of the principal reflecting region and has a gap between terminal ends of the perimeter seal, such as at a location remote from the vent port at the auxiliary wide angle reflector portion. The front and rear substrates are mated together, whereby the seal is cured and the cured seal joins the substrates and spaces the front and rear substrates apart and forms an interpane cavity therebetween. The gap between the terminal ends of the seal provides or establishes a fill port (typically having a width dimension of about 1-2 mm or thereabouts) for the electrochromic mirror cell of the mirror reflective element when the front and rear substrates are mated together. The interpane cavity is filled with an electro-optic medium that flows into the interpane cavity through the fill port. The fill port is plugged to substantially seal the electro-optic medium in the interpane cavity. Optionally, the third surface of the rear substrate may be masked in the area that will be behind the auxiliary wide angle reflector during the reflective coating deposition process so that the spotter area of the third surface is substantially devoid of the reflective coating to allow visual or instrument checking of the seal width and placement to ensure adequate bond throughout the component life.

Therefore, the present invention provides a seal and method of establishing a seal for an exterior reflective element with an integral auxiliary wide angle reflector, with the seal establishing an interpane cavity at the principal reflecting portion or region of the reflective element (with an electrochromic medium established in the interpane cavity), and with the seal partially circumscribing the auxiliary wide angle reflector portion and providing a vent port or means to preclude pressurization and seal blowout at the wide angle reflector portion during the vacuum filling process that establishes the electrochromic medium in the interpane cavity at the principal reflecting portion or region of the reflective element. The seal comprises a unitary seal that is established via a single continuous dispensing process, such as via a computerized dispenser or CNC controlled dispenser and/or robotic device or the like.

The present invention thus provides an integral spotter mirror established such as via grinding or ablating at the second surface of the front substrate of a laminate (i.e., a sandwich type) electrochromic reflective mirror element, and facilitates use of front and rear substrates that are of substantially the same shape, dimension and profile, and does so in a manner that obviates the likes of segregation or banding (as known in the electrochromic mirror arts) of electrochromic species such as may occur during prolonged dimming or coloring of the electrochromic medium (over, for example, several minutes) during usage on the likes of an electrochromic rearview mirror element in an exterior sideview mirror assembly on a vehicle. The present invention facilitates improved production yield and the like due to obviating any convoluted or sharp or low radius scribe/breakout profiles when cutting the rear substrate to be used. The present invention also enables use of the likes of a single heater pad without need to have binary or otherwise complicated approaches.

These and other objects, advantages, purposes and features of the present invention will become apparent upon review of the following specification in conjunction with the drawings.

DESCRIPTION OF THE PREFERRED EMBODIMENTS

Figure 1:
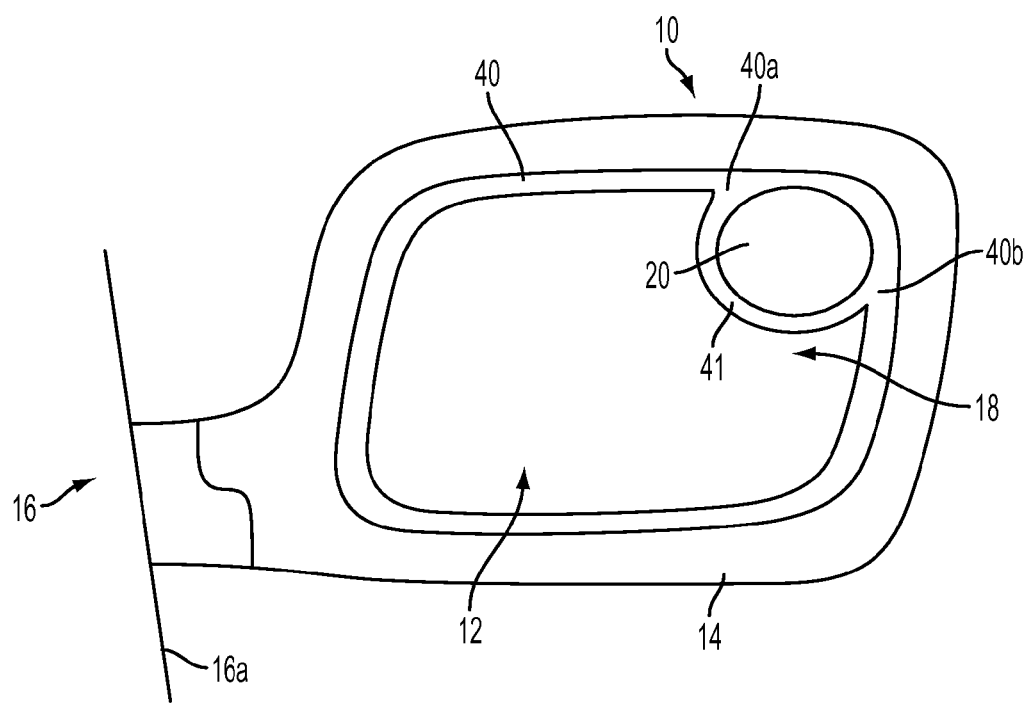
FIG. 1 is a plan view of an exterior rearview mirror assembly with a reflective element assembly in accordance with the present invention.

Referring now to the drawings and the illustrative embodiments depicted therein, an exterior rearview mirror assembly 10 for a vehicle includes a mirror reflective element assembly 12 received in and/or supported by a mirror shell or casing 14 (FIG. 1). Mirror assembly 10 is mounted at the side 16a of a host or subject vehicle 16. Mirror reflective element 12 includes a first or principal mirror reflective element portion 18 and a second or auxiliary wide angle reflective element portion or reflective optic 20, which is integrally formed with the mirror reflective element 12, such as by utilizing aspects of the mirror assemblies described in U.S. Pat. Nos. 8,021, 005; 7,934,844; 7,887,204; 7,824,045; and 7,748,856, which are hereby incorporated herein by reference in their entireties. The auxiliary wide angle optic may be integrally formed such as by physically removing, such as by grinding or ablation or the like, a portion of the second surface of the front substrate so as to create or establish a physical dish-shaped generally convex-shaped depression or recess or crater at the second surface of the front substrate, and coating the formed depression or recess with a reflector coating or element or the like, such as described in U.S. Pat. No. 8,021,005, incorporated above.

The mirror reflective element 12 comprises an electro-optic reflective element, such as an electrochromic reflective element or the like, having a front substrate 22, a rear substrate 24 and an electro-optic medium 26 (such as a solid polymer matrix electrochromic medium or the like) sandwiched therebetween and sealed via a seal material or seal or perimeter seal 28. The seal 28 (such as an epoxy seal material or the like) is disposed between the substrates to establish the interpane cavity for the electrochromic medium and to adhere the substrates together. As can be seen with reference to FIG. 4, the seal 28 is continuously disposed partially around the principal reflecting region 18 of the reflective element, with a fill port or gap 29 established between its terminal ends, and with the seal 28 disposed partially around the wide angle reflecting region 20 of the reflective element, as discussed below. The perimeter seal thus provides an interpane cavity or EC cavity "A" (FIG. 2) for establishing an electrochromic medium therein (such as via a vacuum filling process through a fill port established between terminal ends of the unitary seal), while also partially or substantially circumscribing the auxiliary wide angle reflector portion with a vent port 31 established thereat to limit or substantially preclude pressurization of the auxiliary cavity or gap or spotter cavity "B" (FIG. 2) at the auxiliary wide angle reflector portion during the vacuum filling process, as also discussed below.

Figure 2:
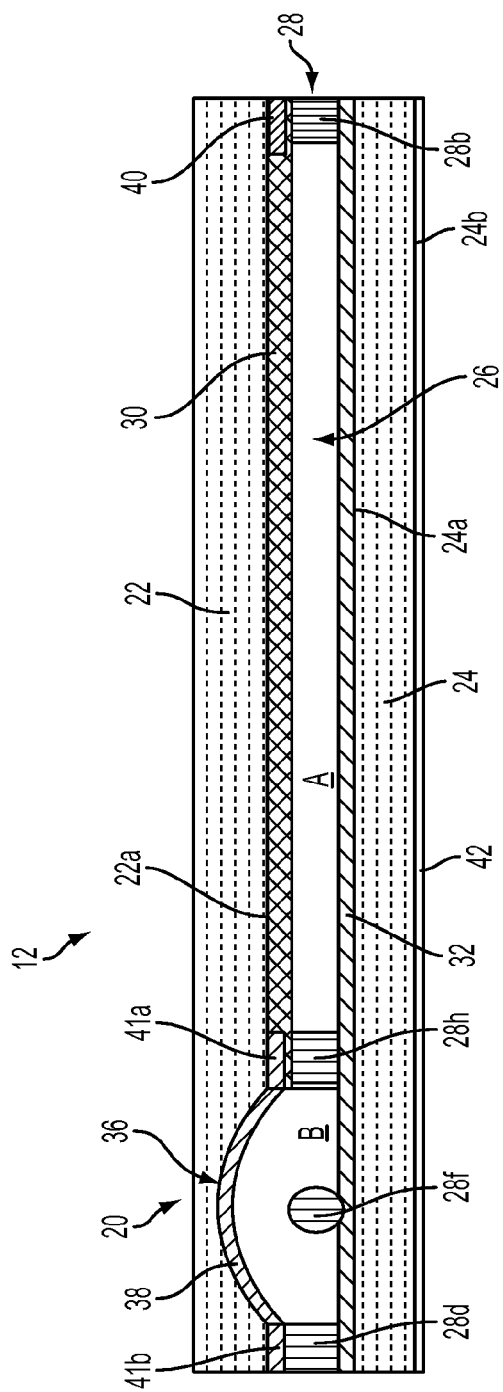
FIG. 2 is a sectional view of the reflective element assembly of FIG. 1.

As shown in FIG. 2, front substrate 22 has a transparent conductor coating 30 (such as an indium tin oxide (ITO) coating or layer) disposed at its second or rear surface 22a at least at the principal reflecting region 18 (and such as described in U.S. Pat. No. 8,021,005, which is hereby incorporated herein by reference in its entirety), while rear substrate 24 has a mirror reflector or coating 32 (such as the likes of a ruthenium/chromium stack of metallic layers or coatings or the like) disposed at its front surface 24a. Thus, in the illustrated embodiment, the mirror reflective element 12 comprises a third surface electro-optic mirror element (such as an electrochromic mirror element), but aspects of the present invention are applicable to fourth surface electro-optic mirror elements (where a transparent conductive coating is disposed at the third surface of the rear substrate and a reflector coating is disposed at the fourth surface of the rear substrate), while remaining within the spirit and scope of the present invention. The front and rear substrates 22, 24 may comprise generally planar mirror substrates or may (for example, for convex or aspheric exterior mirrors) have a radius of curvature in the about 1000 mm to 2000 mm or thereabouts range to provide a wider angle field of view across the principal reflector portion 18 depending on the particular application of the mirror reflective element and exterior rearview mirror assembly.

As also shown in FIG. 2, the auxiliary wide angle reflector portion 20 comprises a recess 36 established at the rear surface of the front substrate, such as via grinding or ablating or the like. The recess 36 is coated with a metallic reflector coating 38 to provide or establish the wide angle reflector at the rear surface of the front substrate of the reflective element. In the illustrated embodiment, the front substrate has the spotter recess 36 established in its uncoated rear surface, and then has the spotter reflector coating 38 established at the spotter recess 36 and around the spotter recess so as to provide the hiding layer portions 41a, 41b (FIG. 2) of the hiding layers of the reflective element, as discussed below. The transparent conductor 30 is disposed over substantially the entire rear surface 22a of the front substrate 22 (and may be disposed over the portions 41a and/or 41b of the hiding layer 41 and/or spotter mirror coating 38) so as to provide a conductive layer or conductive surface at the electro-optic medium 26 and over substantially the entire interface between the front substrate and the electro-optic medium, which is disposed at the principal reflecting portion or region 18 (the EC-active area) of the reflective element and not disposed at the auxiliary wide angle reflector portion or region 20, as discussed below. Thus, electrical conductivity is preserved between the glass substrate and the electro-optic medium across the interface surface of the front substrate at the active EC area, so as to provide substantially uniform dimming of the principal reflecting region of the mirror reflective element (i.e., darkening of the electro-optic medium) when an electrical voltage is applied to the conductive coatings at the opposed surfaces of the front and rear substrates. As described in U.S. Pat. No. 8,021,005, incorporated above, spotter mirror reflector 38 is in electrical contact with the transparent conductive coating 30 at the second or rear surface of the front substrate.

Thus, and as can be seen with reference to FIG. 2, EC-activity such as electrochromic dimming is solely at interpane cavity A, and no such EC-activity is in spotter cavity B, by reason of the fact that there is no electrochromic medium 26 in spotter cavity B. Thus, no matter how long electrochromic dimming or coloring may be prolonged in EC-active interpane cavity A (via powering applied to the transparent conductive coating 30 and the conductive coating 32), no segregation or banding or otherwise potentially deleterious effects can occur at spotter cavity B.

The transparent conductive coating 30 at the rear or second surface 22a of front substrate 22 may comprise one or more transparent electrically conductive layers or coatings disposed or coated thereat (such as an indium tin oxide (ITO) layer, or a doped indium tin oxide layer or any other transparent electrically semi-conductive layer or coating or the like, such as indium cerium oxide (ICO), indium tungsten oxide (IWO), or indium oxide (IO) layers or the like, or a zinc oxide layer or coating, or a zinc oxide coating or the like doped with aluminum or other metallic materials, such as silver or gold or the like, or other oxides doped with a suitable metallic material or the like, or such as disclosed in U.S. Pat. No. 7,274,501, which is hereby incorporated herein by reference in its entirety).

The front or third surface 24a of the rear substrate 24 may include one or more transparent semi-conductive layers (such as an ITO layer or the like), and/or one or more metallic electrically conductive layers (such as a layer of silver, aluminum, chromium or the like or an alloy thereof), and may include multiple layers such as disclosed in U.S. Pat. Nos. 7,274,501; 7,184,190 and/or 7,255,451, which are hereby incorporated herein by reference in their entireties. The reflective element assembly 10 thus may comprise a third surface reflector coated reflective element or transflective reflective element, whereby the reflective layer or surface is disposed at the third surface of the cell or at the front surface of the rear reflective element substrate for viewing by a driver of the vehicle. The coated third surface 24a may also be coated to define a tab-out region (such as by utilizing aspects of the mirror assemblies described in U.S. Pat. Nos. 7,274,501; 7,184,190 and/or 7,255,451, which are hereby incorporated herein by reference in their entireties) for providing electrical connection of the conductive layers to an electrical clip of connector or bus-bar, such as the types described in U.S. Pat. Nos. 5,066,112 and 6,449,082, which are hereby incorporated herein by reference in their entireties.

Optionally, during the third surface reflective coating deposition process, the third surface of the rear substrate may be masked in the area that will be behind the auxiliary wide angle reflector when the mirror reflective element is assembled (and when the front and rear substrates are mated together). Thus, the area of the third surface at the wide angle reflector of the mirror reflective element is substantially devoid of the reflective coating. This allows for visual or instrument checking of the seal width and placement to ensure adequate bond during and after assembly of the mirror reflective element and throughout the component life.

Optionally, the reflective element 12 may include a metallic perimeter band 40 (FIG. 2) around the perimeter of the reflective element and a metallic perimeter band 41 around the perimeter of the auxiliary wide angle reflector portion, such as by utilizing aspects of the reflective elements described in U.S. Pat. Nos. 7,626,749; 7,274,501; 7,184,190; and/or 7,255,451, and/or U.S. patent application Ser. No. 11/226,628, filed Sep. 14, 2005 and published Mar. 23, 2006 as U.S. Publication No. US-2006-0061008, which is hereby incorporated herein by reference in their entireties. For example, a perimeter band portion 40 may be established around the periphery of the rear surface of the glass substrate and a spotter band portion 41 may be established around the periphery of the spotter portion of the reflective element. For example, the perimeter band portion 40 may comprise a band that is about 3-5 mm wide or thereabouts and functions to hide the main or perimeter seal around of the reflective element, while the band portion 41 is established around the spotter portion and may be sized at the discretion of the mirror manufacturer, and may be sized depending on the size of the spotter recess and the size of the principal reflecting area of the mirror reflective element. The areas 40a, 40b where the two band portions 40, 41 meet thus results in a thicker or larger width of the hiding layer at those locations, such as can be seen with reference to FIG. 1, depending on the size and shape of the hiding layer portions 40, 41. As discussed above, the band 40 and the band 41 (and its portions 41a, 41b in FIG. 2) preferably comprise the same material as the spotter mirror reflector coating 38 and are preferably established via the same coating process that establishes the spotter mirror reflector 38 at the curved recess 36 at the rear surface 22a of front substrate 22. As shown in FIG. 2, the transparent conductive coating 30 may be disposed at the rear surface 22a of front substrate 22 and over the perimeter bands or hiding layers 40, 41 (although optionally, the front substrate may have the transparent conductive coating disposed over its entire surface and, after establishing the curved recess at the rear surface of the front substrate, the spotter mirror reflector and hiding layer or layers may be disposed over the established curved surface of the recess and over the transparent conductive coating at the rear surface of the substrate, while remaining within the spirit and scope of the present invention).

Optionally, the perimeter band or bands may comprise a chrome/chromium coating or metallic coating and may comprise a chrome/chromium or metallic coating that has a reduced reflectance, such as by using an oxidized chrome coating or chromium oxide coating or "black chrome" coating or the like (such as by utilizing aspects of the mirror assemblies described in U.S. Pat. No. 7,184,190 and/or U.S. Pat. No. 7,255,451, which are hereby incorporated herein by reference in their entireties). Optionally, the mirror reflective element may comprise a frameless reflective element (such as a frameless exterior mirror assembly or a frameless interior mirror assembly), such as by utilizing aspects of the reflective elements described in U.S. Pat. Nos. 7,626,749; 7,360,932; 7,289,037; 7,255,451; 7,274,501; and/or 7,184,190, and/or PCT Application No. PCT/US2010/32017, filed Apr. 22, 2010, and/or PCT Application No. PCT/US2010/51741, filed Oct. 7, 2010, and/or U.S. patent applications, Ser. No. 11/226,628, filed Sep. 14, 2005 and published Mar. 23, 2006 as U.S. Publication No. US-2006-0061008; and/or Ser. No. 10/538,724, filed Jun. 13, 2005 and published Mar. 9, 2006 as U.S. Publication No. US-2006-0050018, which are hereby incorporated herein by reference in their entireties.

As is known in the art, the seal material 28 is established around the periphery of one of the substrates 22, 24, such as around the periphery of the front or third surface 24a of the rear substrate 24, and substantially circumscribes the substrate surface (such as the front surface 24a of the rear substrate 24) around the EC-active area. The seal 28 may be dispensed in uncured seal form with spacing elements (such as glass beads or the like) that establish and maintain the desired or appropriate gap between the substrates 22, 24 when the substrates are mated together by the cured seal (cured typically by heating in an oven) so that the interpane cavity A has a generally or substantially uniform thickness or gap across the mirror reflective element assembly or cell 12. The uncured seal 28 and spacing elements are disposed or dispensed around the substrate surface and the uncured seal, when dispensed around the substrate surface, has a gap 29 between opposed terminal ends of the perimeter seal to establish the fill port for filling the interpane cavity A with the electrochromic medium (such as via a vacuum fill process or the like).

In the illustrated embodiment, the reflective element 12 includes the integral spotter or recess 36 and spotter reflector coating 38 at an inner or rearward surface of the front substrate. The recess may have a depth of up to about 1.1 mm (relative to the second surface of the front substrate) or thereabouts ground or ablated into an about 2 mm or about 2.2 mm thick piece of glass (or other dimensions such as described in U.S. Pat. Nos. 8,021,005; 7,934,844; 7,887,204; 7,824,045; and 7,748,856, which are hereby incorporated herein by reference in their entireties). It is undesirable to have the electrochromic medium disposed at the spotter area (with the recess at the rear surface of the front substrate and thus the thicker cavity dimension at the spotter area) because of concerns with segregation or banding or otherwise potentially deleterious effects that may occur at an EC-active spotter mirror portion under prolonged electrochromic dimming or coloring of the electrochromic medium at the spotter cavity.

If a perimeter seal were dispensed around the perimeter of the principal reflecting area and around the inboard portion of the spotter recess (and not around the outboard portion of the spotter recess), then the substrates would be spaced apart with a gap and air therebetween at the spotter area (outside of filled and sealed interpane cavity). Such a configuration could allow for water or the like to enter the gap at the spotter area where the water could fill the gap and/or freeze and cause problems with the reflective element, such as cracking of one or both of the substrates. Optionally, the reflective element manufacturer could fill the open area at the spotter portion with a filler material, such as a silicone or the like, such as via a syringe or the like inserted into the gap at the spotter portion. However, such a filling process adds a separate process to the manufacturing process and thus adds cost and complexity to the mirror reflective element manufacturing process.

In order to avoid having an open and unsupported air gap in the formed electrochromic mirror element between the glass substrates at the spotter region, the uncured seal may be dispensed around the EC active area and an entirely different uncured seal may be dispensed around the spotter recess to establish a sealed spotter cavity that is not filled with the electrochromic medium during the cavity filling process. However, such a configuration results in the reflective element having a sealed spotter cavity filled with air. When such a mirror reflective element is exposed to the vacuum (i.e. reduced pressure) during the vacuum fill process (and during the process of mating the two substrates together), the air pressure inside the sealed spotter cavity is not vacuumed or reduced (and thus remains at atmospheric pressure) and thus is at a much higher pressure than the vacuum or reduced pressure surrounding the reflective element and within the interpane cavity at the principal reflecting area during the vacuum filling process. Thus, there is an outward pressure against the seal around the spotter cavity that is exerted against the seal from inside the spotter cavity, which may cause seal blowout or may otherwise damage the seal at the interpane cavity during the filling process.

The present invention avoids such potential problems by providing a seal dispensed around the EC-active area to define the interpane cavity A for receiving the EC medium therein, with a portion of the continuously dispensed uncured seal dispensed partially around the spotter recess and providing a vent port of the spotter cavity B at the spotter recess area and a fill port for the interpane cavity, all via a continuous dispensing of the uncured seal material via a computerized device, such as a CNC controlled dispenser or syringe or the like. The uncured seal thus is dispensed from a fill port location and around a portion of the perimeter of the reflective element and around the spotter recess, and then is dispensed across the spotter recess, and then around and along an inboard portion of the spotter recess and then around the remainder of the perimeter of the interpane cavity, terminating a small distance from the start point to establish or define or form the fill port for the mirror reflective element. The seal thus cuts across or traverses the recess area or region and is dispensed in its uncured form so that a vent port is provided or established at an outboard region of the spotter recess of the completed reflective element to vent the air within the spotter cavity B to limit or substantially preclude concerns with seal blowout during the vacuum fill process. The portion of the seal that traverses the recess area does not seal to both glass substrates across the recess area because the seal is dispensed at a smaller height dimension than the combination of the cell gap and recess depth (as can be seen at 28f in FIGS. 2 and 3), such that there is a gap between the cured seal dispensed on the front surface of the rear substrate and at least a portion of the curved recess at the rear surface of the front substrate after the front and rear substrates are pressed together and joined together via the cured seal. In the illustrated embodiment, the seal approaches itself in its uncured form and pinches or seals together at an upper corner of the spotter recess when the substrates are squeezed together during mating of the substrates so that the cured seal at that location has no gap.

At the location where the seal crosses or hits itself, the seal may be wider than at other locations around the reflective element, but this is an area where the hiding layers 40, 41 provide a wider band (such as shown in FIG. 1), so the wider portion 40a of the hiding layer or layers 40, 41 (where the two hiding layer patterns meet) hides the wider or spread out seal at this location. Also, the vent port for the spotter cavity B is located at a bottom or lower portion of the spotter cavity B or spotter area, so any moisture or water, if in the spotter cavity B, can drain out through the vent port to limit or substantially preclude damage to the reflective element that may occur if water accumulates in the cavity and freezes.

Figure 3:
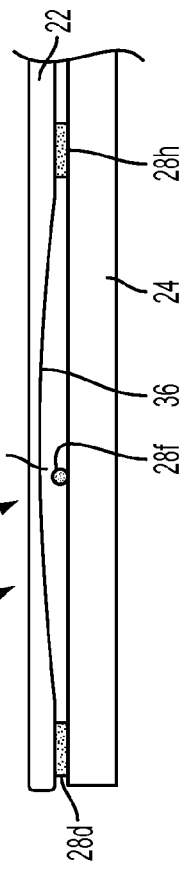
FIG. 3 is another sectional view of the spotter portion of the reflective element assembly, showing the bead disposed across the auxiliary wide angle reflector region in accordance with the present invention.
Figure 4:
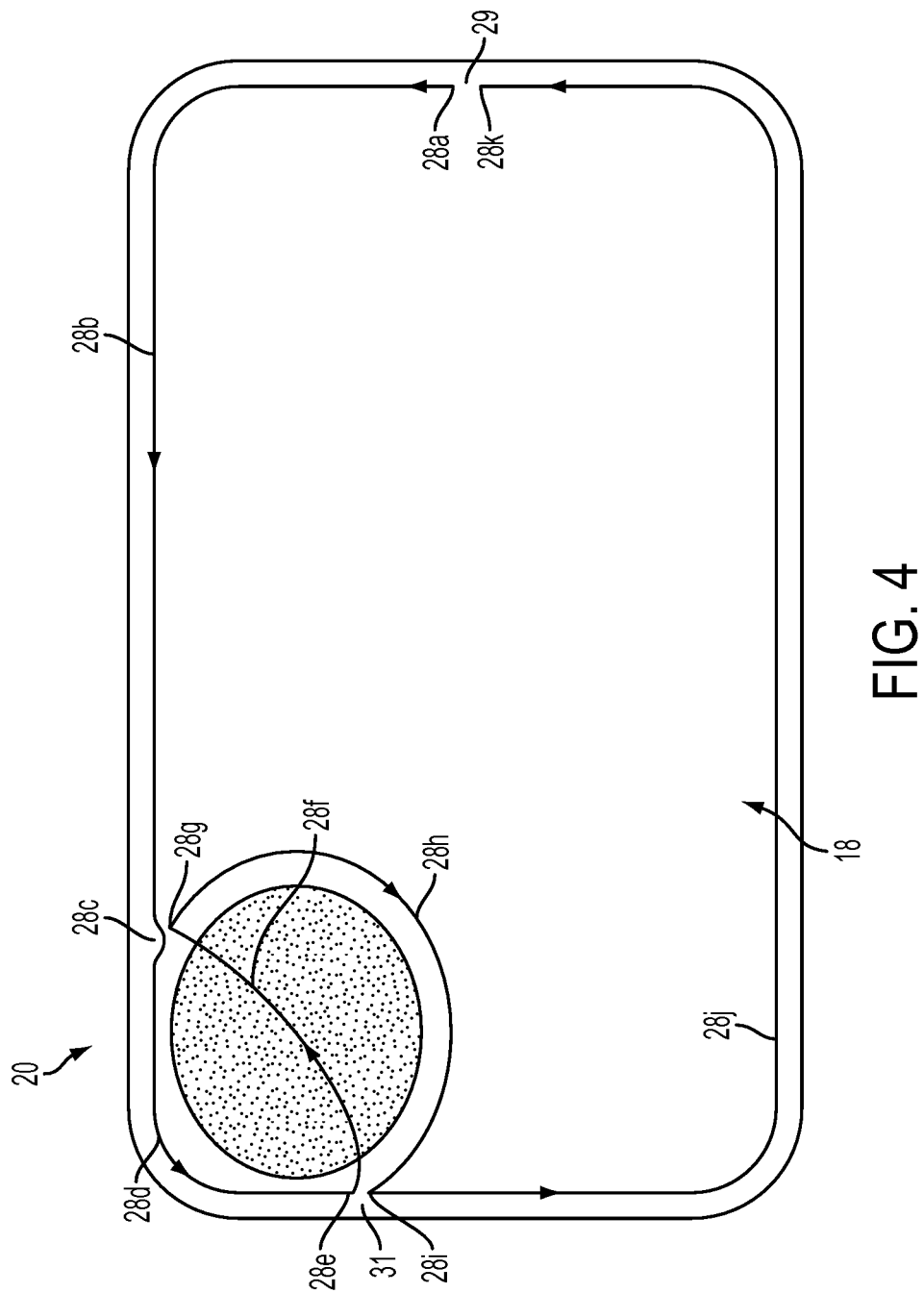
FIG. 4 is a plan view of the reflective element assembly of FIG. 2, showing the perimeter seal as disposed partially around the auxiliary wide angle reflector portion in accordance with the present invention.

For example, and with reference to FIG. 4, the uncured seal 28 may be precision dispensed (such as via a CNC controlled syringe or dispenser head) in a continuous manner by first starting the uncured seal at an edge of the fill port location 29, such as at 28a and continuing along a perimeter region of the substrate at 28b, such as the front surface 24a of the rear substrate 24. Using such precision CNC controlled dispensing equipment (such as known and used in the electrochromic mirror manufacturing art), a continuous bead of uncured adhesive that has a uniform width dimension and height dimension can be achieved (such as by utilizing aspects of the mirror assemblies described in U.S. Pat. No. 5,066,112, which is hereby incorporated herein by reference in its entirety). The height dimension is typically somewhat larger than the diameter of the glass beads that are in the seal material so that, when the substrates are mated together, the cured seal height will be smaller but the cured seal width will be larger than the dispensed uncured bead of seal material. However, the squeeze-out of the uncured seal material upon mating of the substrates is controlled to be relatively small so as to obviate seal show when the reflective element is used on the vehicle. Although the substrate in FIG. 4 is shown with the spotter recess, that is shown for reference purposes, and it is preferred that the seal is dispensed at the front surface of the rear substrate, such as shown in FIGS. 2 and 3 (but the seal could be dispensed at the rear surface of the front substrate, while remaining within the spirit and scope of the present invention). At the spotter region 20, the dispensed uncured seal may curve slightly towards the spotter recess area (such as at 28c) and continues around or partially circumscribes the outboard portion of the curved recess at 28d (or where the curved recess will be when the front substrate is mated with the rear substrate in applications where the seal is dispensed on the rear substrate). As the dispensed uncured seal 28 approaches a lower or bottom region of the spotter recess area, the dispensing path of the uncured seal turns or curves at 28e and a seal portion 28f is dispensed across the spotter recess area and approaches the previously dispensed seal portion 28c at the upper inboard region of the spotter recess area at 28g. The uncured seal portions 28g and 28c may be dispensed so as to contact one another or may be slightly separated from one another (but with any separation or gap being small enough so that the seal portions 28g, 28c will contact and seal against one another during compression of the seal when the substrates are mated together). The seal is then dispensed along or partially circumscribes the inboard portion of the curved recess area at 28h and approaches the previously dispensed sealed portion 28e and turns or curves at 28i to establish the gap or vent port 31 at the lower outboard region of the curved recess area. The seal is then dispensed along the perimeter region of the substrate at 28j and terminates or ends at 28k, which is spaced from the starting point 28a, thus defining the gap or fill port 29 between the opposed terminal ends of the continuous, non-interrupted seal.

After the continuous bead of the uncured seal 28 has been dispensed such as described above, the front substrate is mated with the rear substrate and the seal is compressed slightly until the spacer beads establish the desired or appropriate or selected gap dimension between the substrates. The compression of the seal material during the mating of the substrates together ensures that the seal at seal portions or locations 28c, 28g contact and seal against one another so that the EC-active area or principal reflecting area 18 has a continuous sealed perimeter that can be vacuum filled with the electrochromic medium through the fill port 29. The spotter cavity B at the curved recess area is not sealed because (a) the seal portion 28f does not seal against both substrates (as shown in FIGS. 2 and 3, the seal portion 28f may be dispensed on the third surface of the rear substrate and is spaced from the recessed surface 36 of the front substrate when the front and rear substrates are mated together), and (b) the seal has a gap or vent port 31 at the outboard portion of the spotter cavity B or spotter recess area (where the seal portions 28e and 28i are sufficiently spaced apart so that any squeezing or compression of the seal during the mating of the substrates together will not cause the seal portions 28e, 28i to seal against one another).

Figure 5:
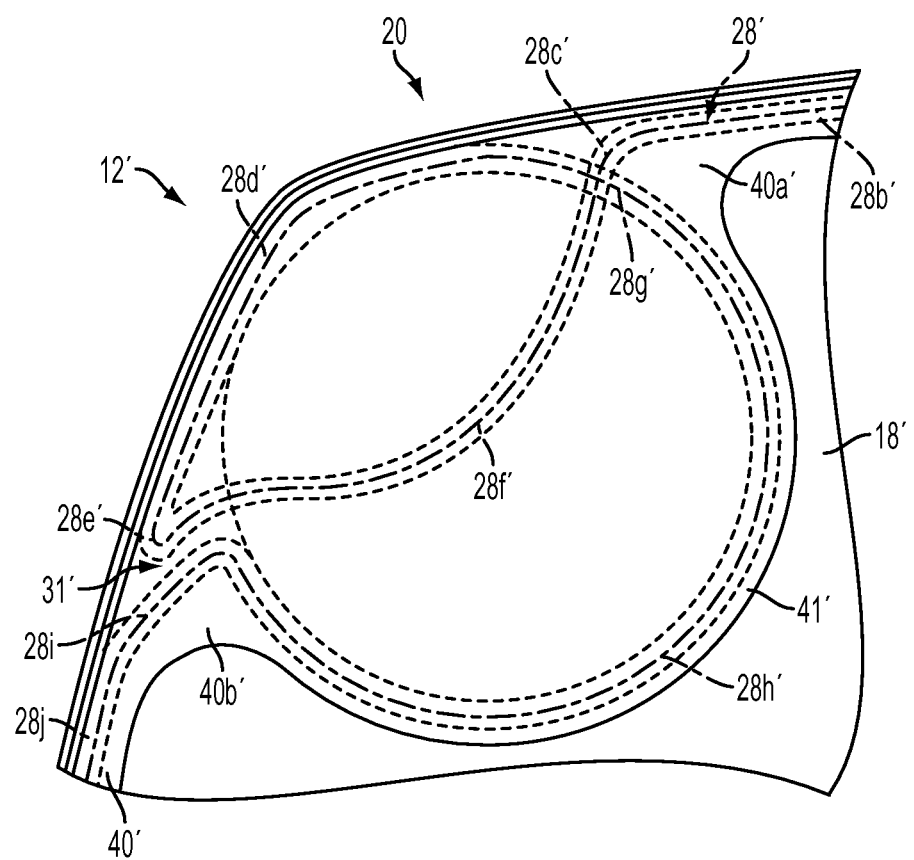
FIG. 5 is a plan view of another reflective element assembly of the present invention, showing the perimeter seal disposed around the auxiliary wide angle reflector portion.

Optionally, and with reference to FIG. 5, a mirror reflective element 12' includes a principal reflecting region 18' and a wide angle spotter region 20', with an integral curved recess 36' and spotter mirror reflector established at the rear or second surface of the front substrate, such as described above. The reflective element 12' includes a seal 28' that is disposed around the principal reflecting region 18' to define or establish the interpane cavity at the EC-active area and is disposed substantially around the wide angle spotter region 20' to define or establish a spotter cavity at the spotter region, such as in a similar manner as described above. In the illustrated embodiment of FIG. 5, the seal is dispensed in a continuous manner by first starting the seal at an edge of the fill port location and continuing along a perimeter region of the substrate at 28b', as discussed above. At the spotter region 20', the seal may curve slightly towards the spotter recess area (such as at 28c') and continues across the spotter region 20' and curves downward to define an upper boundary at 28e' of the vent port 31' that will be established at the outboard region of the spotter portion when the substrates are mated together. The seal continues around or partially circumscribes the outboard portion of the curved recess at 28d' (or where the curved recess will be when the front substrate is mated with the rear substrate in applications where the seal is dispensed on the rear substrate). As the seal 28' approaches the previously dispensed seal portion 28c', the seal crosses over the seal portion 28c' at seal portion 28g' (such as by adjusting the z-height during the CNC dispensing process). The seal is then dispensed along or partially circumscribes the inboard portion of the curved recess area at 28h' and approaches the previously dispensed sealed portion 28e' and turns or curves to establish the lower boundary at 28i' of the gap or vent port 31' at the lower outboard region of the curved recess area. The seal is then dispensed along the perimeter region of the substrate at 28j' and terminates or ends near the starting point, thus defining the gap or fill port between the opposed terminal ends of the continuous, non-interrupted seal, as discussed above.

Thus, the seal 28' crosses over itself at an upper inboard region of the spotter portion, but the additional seal material at this area, when compressed to the substrate gap dimension when the substrates are mated together, will not be noticeable or discernible to a person viewing the finished reflective element assembly because it is located at a thicker portion or area 40a' of the hiding layer or perimeter border bands 40', 41' and is thus hidden from view or rendered covert by the hiding layer. Likewise, and as shown in FIG. 5, the vent port 31' is hidden from view or rendered covert behind a portion 40b' of the hiding layer or perimeter bands 40', 41'. As also shown in FIG. 5, the seal 28' also provides a generally downward directed vent port 31' (that is directed generally downward away from the spotter portion when the reflective element and mirror assembly are normally mounted at a vehicle), which limits or substantially precludes water or contaminant intrusion into the spotter cavity through the vent port 31' and drains any water or moisture or condensation that does enter the spotter cavity out from the spotter cavity.

Thus, the present invention provides a method of making or forming a reflective element with an integral wide angle spotter mirror reflector for an exterior rearview mirror assembly of a vehicle. The method includes dispensing a continuous seal around and defining or bounding sealed interpane cavity for receiving an electrochromic medium and an unsealed or vented cavity at an integral wide angle spotter portion of the reflective element. The unsealed or vented spotter cavity allows manufacture of such a reflective element without an electrochromic medium disposed at the spotter portion, while limiting or substantially precluding seal blowout of the seal at or around the spotter portion during the vacuum mating process typically used to draw the substrates together and compress the seal to mate the substrates and during the vacuum filling process typically used to fill the interpane cavity at the EC-active area with an electrochromic medium. The present invention provides these advantages while facilitating dispensing of the seal around the EC-active region and substantially around the spotter portion via a continuous seal or bead, which may be continuously dispensed via a computer controlled or CNC controlled dispensing device. The dispense path for dispensing the uncured seal bead is started on a surface and in a manner that spaces apart the beginning and tail end of the dispense path in order to regulate the fill port gap accurately. Because it would be difficult and not practical to do this at the vent port area, the continuous dispensing path described above enhances and optimizes the dispensing of the seal and the finished reflective element assembly.

Optionally, a heater pad 42 (FIG. 2) may be disposed at the rear or fourth surface 24b of the rear substrate 24 to provide heat at the mirror reflective element to defrost or defog the mirror reflective element at the principal reflecting area 18 and at the spotter reflector area 20. The heater pad 42 on the fourth surface may optionally have enhanced or increased or concentrated heating thereat to heat across the air gap at spotter cavity B so as to heat the front substrate at the spotter reflector area 20. Alternatively, a sealant material, and preferably a material with a good heat conductivity, can be injected through vent port 31 to fill or partially fill spotter cavity B. For example, spotter cavity B may be filled with a silicone or any other suitable material, and the heat conductive material may enhance heating across the spotter cavity when the heater pad 42 at the rear surface of the rear substrate is activated. Because the spotter cavity B and any such filler material is to the rear of the hiding layer and spotter mirror reflector 38, the filler material will not be viewable or discernible or visible to a person viewing the reflective element when the reflective element and exterior mirror assembly are normally mounted at a vehicle.

The heater pad or element at the rear surface of the glass substrate may comprise a mirror defrost/demisting heater such as a heater pad or a heater film or a heater element, and may provide an anti-fogging of de-fogging feature to the exterior mirror assembly, and may utilize aspects of the heater elements or pads described in U.S. Pat. Nos. 8,058,977; 7,400,435; 5,808,777; 5,610,756 and/or 5,446,576, and/or U.S. patent application Ser. No. 11/779,047, filed Jul. 17, 2007, and published Jan. 17, 2008 as U.S. Pat. Publication No. 20080011733; and/or Ser. No. 13/111,407, filed May 19, 2011 and published Nov. 24, 2011 as U.S. Publication No. US-2011-0286096, which are hereby incorporated herein by reference in their entireties. The heater element may include electrical contacts that extend rearward therefrom and through an aperture of attaching portion of back plate for electrical connection to a wire harness or connector of the mirror assembly, or the back plate and/or heater pad may include suitable electrical connectors and connections incorporated therein (such as by utilizing aspects of the mirror assembly described in U.S. Pat. No. 7,400,435, which is hereby incorporated herein by reference in its entirety) for electrically connecting the heater pad (or other suitable electrical connectors may be utilized, such as electrical leads or wire harnesses or pigtails or other separate connectors or cables or the like).

The method of making or forming the reflective element assemblies in accordance with the present invention thus includes providing a substrate and establishing or dispensing a perimeter seal material along the periphery of a surface of the substrate to substantially circumscribe the perimeter region of the substrate surface, with a gap between opposed terminal ends of the seal material. For example, an uncured adhesive seal material, such as an uncured epoxy material or the like (with uniform and defined diameter glass beads imbedded therein), may be applied to the surface of the substrate (such as, for example, the rear substrate of the mirror cell) along the perimeter region of the surface of the mirror shape or substrate, and partially around the spotter recess and across the spotter recess area as discussed above. The other substrate (such as, for example, the front cut shape or substrate) is superimposed upon the rear substrate and spaced therefrom by the applied uncured material (with spacing elements or beads disposed therein) and is mated with the first substrate to assemble the substrates together (such as via a vacuum mating process). The uncured adhesive material is then cured, such as by heating, to adhere the shapes or substrates together and to space the glass sheets or substrates apart a desired amount to define the appropriate interpane cavity or spacing. The electrochromic medium (such as an electrolyte or monomer composition) is then filled into the interpane cavity or cavities via the fill port provided in the perimeter material or seal (and optionally through a filter element at the fill port), such as via a vacuum fill process, all while the spotter portion or cavity is vented to avoid pressurization at the spotter portion during the fill process.

Optionally, after the interpane cavity A of the electrochromic cell has been filled and the fill port 29 has been plugged or sealed, a sealant or filler material may be injected through vent port 31 to fill or substantially fill the spotter cavity B. The spotter cavity B would thus be filled with a sealant and would thus preclude ingress of moisture or water or contaminants into the filled spotter cavity B. Optionally, after vacuum filling the interpane cavity A and plugging the fill port 29, the vent port 31 at spotter cavity B may be plugged or filled with a suitable plug seal material (and cured or the like via known processes). The spotter cavity B would thus be sealed air gap that is sealed to preclude ingress of moisture or water or contaminants into the spotter cavity B. Because the plugging of the vent port 31 is done after the vacuum filling of the interpane cavity A, any concerns with seal blowout of the seal around the spotter cavity are obviated.

Thus, the present invention provides a method of sealing a mirror reflective element having an integrated spotter portion. The method provides an electrochromic reflective element with an integral spotter mirror portion, without having the electrochromic medium in contact with the spotter portion, such that phenomena such as banding and segregation (such as may occur when the electrochromic medium is disposed at the spotter region) are obviated.

As is well known in the laminate electrochromic mirror art, an electrochromic mirror element or cell is formed by dispensing the uncured seal material around a periphery of one of the substrates while leaving a gap between opposed ends or portions of the seal material. The gap is formed/included to establish the fill port when the substrates are adhered together by the seal material and when the seal material is cured. The gap dimension or width dimension (the distance between the opposed ends or portions of the seal material) is selected to be larger than what may be necessary for filling the cell with the electro-optic material. During the cell manufacturing process, the substrates are brought together to sandwich the uncured seal material, with the interpane gap or distance being ultimately established by the likes of rigid glass or plastic beads in the seal material.

For example, the interpane distance of a typical mirror cell (or separation distance between the adhered glass substrates) is typically between about 50 microns and about 300 microns, more typically between about 80 microns and about 250 microns, and often between about 100 microns and about 200 microns, while the gap width or seal gap dimension (the dimension between the opposed ends or portions of the seal material) may be around 0.5 mm to around 1 mm or thereabouts (more or less). Optionally, filtering means may be implemented to limit or substantially preclude ingress of particles or contaminants or debris into the mirror cell during the vacuum filling process such as by establishing or providing a filter material or element or elements at or near or in the fill port and/or fluid that limit the size of particles that may enter the cell cavity during the filling process and thus that limits or retards or reduces or substantially precludes particle ingress into the interpane cavity during the fill process, such as by utilizing aspects described in U.S. patent application Ser. No. 13/099,554, filed May 3, 2011 and published Dec. 8, 2011 as U.S. Publication No. US-2011-0299170, which is hereby incorporated herein by reference in its entirety.

The seal is preferably continuously dispensed, starting at one edge of the fill port location and ending at the opposed edge of the fill port location, and may be dispensed or laid down with a computer numerical control ("CNC") controlled dispenser (such as of the types described in U.S. Pat. No. 5,724,187, which is hereby incorporated herein by reference in its entirety). The seal includes spacers or beads of a desired or selected diameter to establish the desired cell gap (such as, for example, 88 micron diameter glass beads may be disposed in the seal resin material to establish an interpane cavity gap distance of 88 microns). Preferably, the CNC dispenser or syringe functions to continuously dispense the seal material onto the glass substrate, and typically starts at one edge of the fill port and continues around the EC-active area and stops at other edge of fill port (thereby defining or establishing the fill port between the terminal ends of the seal). The seal is dispensed about the periphery of the EC-active area of the reflective element to define the boundary of the interpane cavity, and such as at a height of, for example, around 0.1 mm or more (slightly greater than the diameter of the spacer beads) so that the seal is squeezed and compressed as the glass substrates are pressed together. The height of the uncompressed seal is less than the gap or separation distance between the surface of the rear substrate and the curved or recessed surface of the spotter recess, such that the seal is not compressed or joined between these surfaces when the substrates are pressed together (or vacuum drawn together) and joined together.

The sandwich of substrates may then be moved to a curing oven or fixture, which cures the epoxy seal material in a known manner, such as heat curing at approximately 150 degrees C. or via other processes. After the seal material is cured, the empty cell may then be filled, such as with an electrolyte or monomer composition, and plugged at a filling station (such as a vacuum filling station) in a known manner (or the sandwich of shapes or cells may be filled as described below). The formed empty mirror cell (comprising the two glass substrates joined together by the seal in the manner described above) may be filled via any suitable interpane cavity filling process or means, and may utilize aspects of the assemblies and systems described in U.S. Pat. No. 5,140,455, which is hereby incorporated herein by reference in its entirety. For example, mirror cells are typically filled via a vacuum backfill technique. In such a vacuum filling or backfilling process, the empty cell is placed in a vacuum chamber along with a container (typically a dish or small cup or the like) of the electro-optic medium fluid (such as electrochemichromic fluid or the like) intended to be filled through the single fill hole or fill port 29 into the cell cavity. While the fill port is not in the fluid, the chamber is evacuated to a high vacuum, such as 1 mm Hg or better, which establishes a vacuum within the interpane cavity. Means are then used to position the reflective element so that the fill hole is in the electro-optic medium fluid and under the surface of the electro-optic medium fluid. The chamber is then vented to atmospheric pressure (typically using nitrogen or similar inert gas or the like) or otherwise pressurized, and the atmospheric or increased pressure forces the fluid into the cell cavity and so fills it with the electro-optic medium fluid. After the cell cavity is filled, the fill port is plugged or sealed, such as via a plugging process, where an epoxy or other suitable material (such as a suitable UV curable adhesive or the like) is established at and in the fill port and cured to seal the fill port and seal the fluid within the interpane cavity.

The mirror cells thus may be loaded into the vacuum fill chamber and filled (such as via dipping the cells into an electrolyte or monomer composition or electrochromic medium or via depositing or shooting the electrolyte or monomer composition or electrochromic medium onto or at the fill opening of the vacuumed cell, and such as by utilizing aspects of the assemblies and systems described in U.S. Pat. No. 5,140,455, which is hereby incorporated herein by reference in its entirety), and then removed and conveyed to a plugging station, where an operator may remove the mirror cell, clean the end of the cell (that was dipped into the electrolyte or monomer composition or electrochromic medium during the filling process) and plug the fill hole with a plug, such as a UV curable adhesive or glue or the like. Optionally, the gap of fill port may be plugged with a non-conductive seal or plug material, such as a UV curable or heat curable seal or plug material (such as described in U.S. Pat. Nos. 6,207,083; 5,724,187; 5,233,461; and 5,142,407, which are hereby incorporated herein by reference in their entireties), to substantially seal the cell. After the hole is plugged, the cell is conveyed through a UV curing area which may emit UV light or radiation or energy to cure the UV curable adhesive plug, and is then conveyed to a cleaning station, where the cell is cleaned. Optionally, the substrates may be adhered together after being cut to their mirror shape or while in a larger sheet form with other substrates or mirror shapes, such as by utilizing aspects of the mirror assemblies described in U.S. Pat. No. 7,255,451, which is hereby incorporated herein by reference in its entirety.

Before or when or after the completed reflective element assembly is mounted at or received at a mirror casing or the like, electrical connectors may be conductively connected to the conductive coatings at the second surface of the front substrate and at the metallic reflector coating at the third surface of the rear substrate, whereby electrical power is selectively applied to the coatings via the connectors (and via the vehicle power source and dimming circuitry of the mirror assembly or vehicle) to vary the degree of dimming or darkening of the electro-optic medium of the mirror reflective element or cell. Optionally, the clean cell may then receive an electrode clip, which may be glued to the cell with a UV curable adhesive at a gluing station, and then may be conveyed to a UV curing area to cure the UV curable adhesive to adhere the clip to the cell. Optionally, the cell may then be conveyed to a soldering station, where a wire harness may be soldered to the electrode clip at the soldering station in a known manner to complete the cell manufacturing. Optionally, a tab-out area and the electrode clips of the rear substrate may then be encapsulated via known means at a tab-out coating/curing station.

Figure 6:
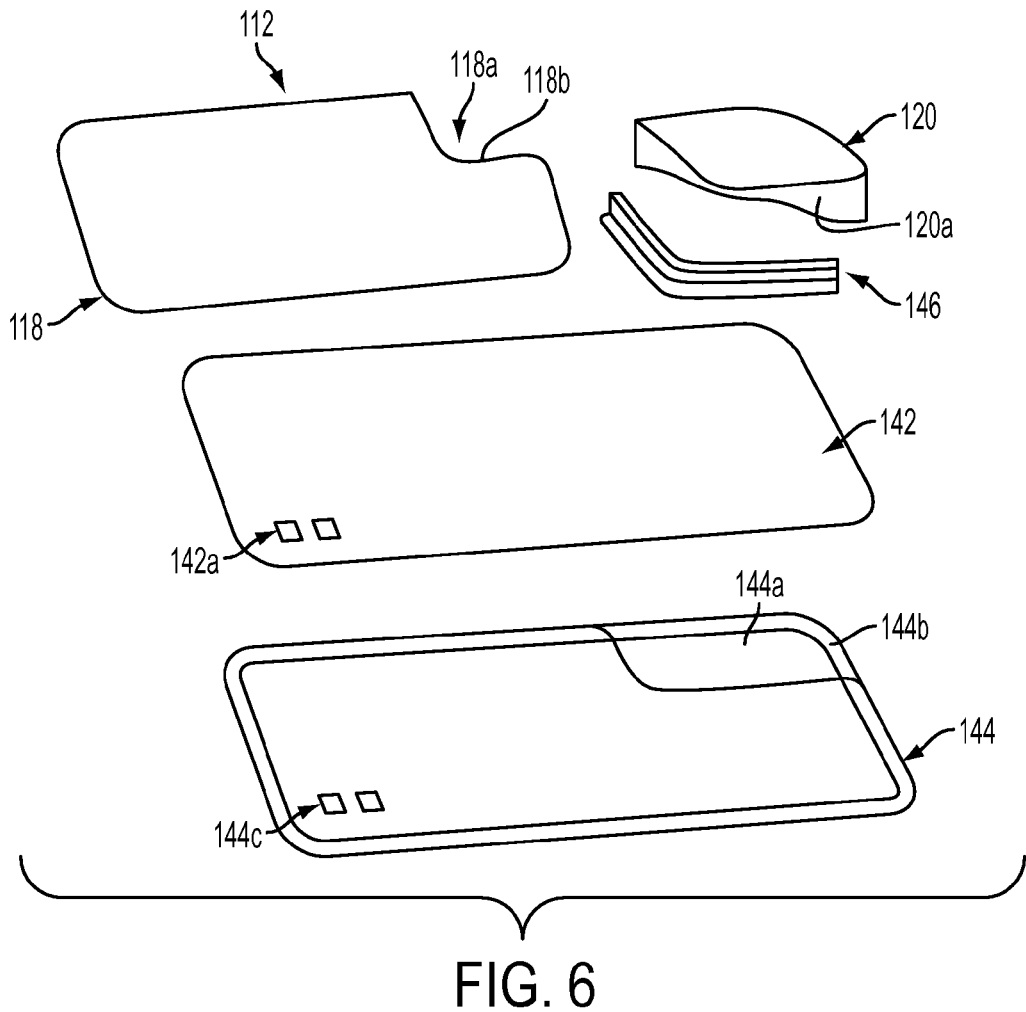
FIG. 6 is an exploded perspective view of another exterior rearview reflective element assembly in accordance with the present invention.
Figure 7:
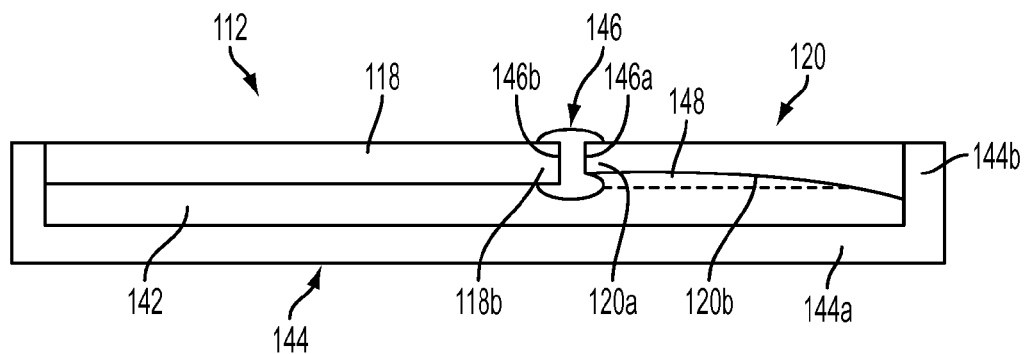
FIG. 7 is a sectional view of the reflective element assembly of FIG. 6, taken across a portion of the wide angle optic.

Optionally, and with reference to FIGS. 6 and 7, an exterior rearview reflective element assembly 112 includes a generally planar (or slightly curved or bent) glass substrate 118 that provides a principal mirror reflecting portion and a wide angle optic or lens or reflector 120 at a corner region adjacent a cutout portion 118a of the glass substrate 118 to provide an auxiliary wide angle reflector portion. The mirror assembly includes a back plate 144, which may have a pocket 144a established thereat for receiving the auxiliary wide angle optic (such as by utilizing aspects of the mirror assemblies described in U.S. patent application Ser. No. 12/187,725, filed Aug. 7, 2008, now U.S. Pat. No. 8,786,704, which is hereby incorporated herein by reference in its entirety), and a heater pad 142, which is disposed between the back plate 144 and the glass substrate 118 and wide angle optic 120. An insert element 146 (such as a molded plastic or polymeric element) is disposed along an inboard perimeter edge 120a of wide angle optic and receives or abuts against the perimeter edge 120a of wide angle optic 120 and the perimeter edge 118b of the glass substrate at the recess or cut away region 118a.

The back plate 144 may include a perimeter lip 144b along its perimeter edges to form a pocket for receiving or partially receiving the heater pad 142 and the glass substrate 118 and the wide angle optic 120, such that the back plate provides a frame around the perimeter of the reflective element when the reflective element is received in the back plate and attached thereto (such as via an adhesive or the like between the generally planar surface of the back plate and the heater pad and an adhesive or the like between the heater pad and the rear surface of the glass substrate). The auxiliary wide angle optic 120 is disposed at the pocket area or corner region 144a of the back plate 144 and between the insert element 146 and the perimeter lip 144b of the back plate 144, and is retained thereat via any suitable attaching means, such as an adhesive or the like or such as a mechanical attachment (such as, for example, a groove and/or lip 146a established along the insert element 146 for receiving the inboard perimeter edge 120a of the wide angle optic 120 and optionally a groove or lip established along the perimeter edge of the back plate for receiving the outboard perimeter edge of the wide angle optic to substantially retain the wide angle optic relative to the back plate and glass substrate). As shown in FIG. 7, the insert element 146 may comprise a groove 146a for receiving the inboard edge of the wide angle optic 120 and a groove 146b for receiving the outboard edge 118b of glass substrate 118 at the cutaway region of the substrate 118. The insert element thus may function to retain the wide angle optic 120 relative to the generally planar glass substrate.

Although shown as having an overlapping portion or lip 146c that overlaps a portion of the front surface 118c of the glass substrate 118 and a portion of the front surface 120c of the wide angle optic, the insert element may not have such an overlapping portion or lip (such that an outer surface of the insert element is generally flush with or coplanar with the outer or front surfaces of the glass substrate and wide angle optic), and the insert element may be adhesively attached to or insert molded at and between the wide angle optic and the glass substrate, while remaining within the spirit and scope of the present invention. The insert element may comprise any suitable material, such as a molded plastic or polymeric material or an extruded flexible plastic or polymeric material, while remaining within the spirit and scope of the present invention. The insert element may comprise an opaque or dark or black material so as to provide a demarcation function to demarcate the interface between the generally planar substrate 118 and the wide angle optic 120, or the insert element may comprise a colored or reflective surface or appearance so as to be less discernible to a person viewing the front surface of the reflective element when the mirror assembly is normally mounted at a vehicle.

As shown in FIG. 6, heater pad 142 comprises a single continuous heater pad that is disposed substantially across the entire back plate so as to provide heating at the rear of the generally planar (or slightly curved or bent) glass substrate 118 and at the curved rear surface 120b of the wide angle optic 120. The heater pad may comprise a mirror defrost/demisting heater such as a heater pad or a heater film or a heater element, and may provide an anti-fogging of de-fogging feature to the exterior mirror assembly, and may utilize aspects of the heater elements or pads described in U.S. Pat. Nos. 8,058,977; 7,400,435; 5,808,777; 5,610,756 and/or 5,446,576, and/or U.S. patent application Ser. No. 11/779,047, filed Jul. 17, 2007, and published Jan. 17, 2008 as U.S. Pat. Publication No. 2008/0011733; and/or Ser. No. 13/111,407, filed May 19, 2011 and published Nov. 24, 2011 as U.S. Publication No. US-2011-0286096, which are hereby incorporated herein by reference in their entireties. The heater element may include electrical contacts 142a that extend rearward therefrom and through an aperture or apertures 144c of the attaching portion of the back plate for electrical connection to a wire harness or connector of the mirror assembly, or the back plate and/or heater pad may include suitable electrical connectors and connections incorporated therein (such as by utilizing aspects of the mirror assembly described in U.S. Pat. No. 7,400,435, which is hereby incorporated herein by reference in its entirety) for electrically connecting the heater pad (or other suitable electrical connectors may be utilized, such as electrical leads or wire harnesses or pigtails or other separate connectors or cables or the like).

By providing a demarcating or separating insert element 146 between the generally planar glass substrate and the wide angle optic, the present invention allows for use of a single, continuous heater pad for heating both the glass substrate and the wide angle optic. Optionally, and such as shown in FIG. 7, the recess or cavity established between the curved rear surface 120b of the wide angle optic and the generally planar surface of the heater pad 142 may be filled with a heat conductive material 148 to enhance the heating of the wide angle optic 120 when disposed at the heater pad 142. The filler material 148 may comprise any suitable heat conductive material, such as a sealant material, and preferably a material with a good or enhanced or sufficient heat conductivity, which may be injected into the cavity between the rear surface of the wide angle optic and the front surface of the heater pad to fill or partially fill the spotter cavity. For example, the spotter cavity may be filled with a silicone or any other suitable material, and the heat conductive material may enhance heating across the spotter cavity when the heater pad 142 at the rear surface of the rear substrate is activated.

As discussed above, the rearview mirror reflective element assembly of the present invention comprises an electro-optic or electrochromic reflective element assembly or cell, such as an electrochromic mirror reflective element assembly with coated substrates that are coated utilizing principles disclosed in commonly assigned U.S. Pat. Nos. 7,310,178; 7,274,501; 7,255,451; 7,195,381; 7,184,190; 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, which are hereby incorporated herein by reference in their entireties, and/or as disclosed in the following publications: N. R. Lynam, "Electrochromic Automotive Day/Night Mirrors", SAE Technical Paper Series 870636 (1987); N. R. Lynam, "Smart Windows for Automobiles", SAE Technical Paper Series 900419 (1990); N. R. Lynam and A. Agrawal, "Automotive Applications of Chromogenic Materials", Large Area Chromogenics: Materials and Devices for Transmittance Control, C. M. Lampert and C. G. Granquist, EDS., Optical Engineering Press, Wash. (1990), which are hereby incorporated by reference herein in their entireties. Optionally, the electrochromic circuitry and/ or a glare sensor (such as a rearward facing glare sensor that receives light from rearward of the mirror assembly and vehicle through a port or opening along the casing and/or bezel portion and/or reflective element of the mirror assembly) and circuitry and/or an ambient light sensor and circuitry may be provided on one or more circuit boards of the mirror assembly that receives or incorporates the mirror reflective element assembly or cell constructed in accordance with the present invention.

Typically, the material for the substrates comprises glass, such as soda-lime glass or the like, but other materials, such as polycarbonate or other polymeric materials may be utilized without affecting the scope of the present invention. The completed mirror cells or reflective element assemblies include a front substrate and a rear substrate. The rear substrate may have a reflective coating on its front surface (toward the front substrate when the substrates are sandwiched together, and typically referred to as the third surface of the mirror reflective element assembly), while the front substrate may have a transparent semiconductive coating, such as a coating of indium tin oxide (ITO) or doped indium tin oxide or the like, on its rear surface (toward the rear substrate when the substrates are sandwiched together, and typically referred to as the second surface of the mirror reflective element assembly).

Optionally, the substrate surface of the front and/or rear substrates may be initially coated with a transparent electrically conductive coating, such as a low cost tin oxide coating or the like, such as the types described in U.S. Pat. Nos. 6,420,036; 6,245,262; 6,154,306; and 5,724,187, which are hereby incorporated herein by reference in their entireties. For example, a mirror assembly manufacturer may purchase tin oxide-coated glass substrates or sheets, such as sold by the LOF Glass division of Libbey-Owens-Ford Co., Toledo, Ohio under the trade name of "TEC-Glass" products, such as "TEC 10" (10 ohms per square sheet resistance), "TEC 12" (12 ohms per square sheet resistance), "TEC 15" (15 ohms per square sheet resistance) and "TEC 20" (20 ohms per square sheet resistance) tin oxide-coated glass and the like. Moreover, tin oxide coated glass substrates, such as commercially available from Pittsburgh Plate Glass Industries, Pittsburgh, Pa. under the "SUNGATE" trade name, may be advantageously employed herein.

Although shown as having generally flush edges, the cells manufactured by the process of the present invention may have generally or substantially flush edges or offset edges or overhang regions or the like, while remaining within the spirit and scope of the present invention, such as the types of cells described in U.S. Pat. Nos. 7,274,501; 7,184,190 and/or 7,255,451, which are hereby incorporated herein by reference in their entireties, or may have other forms or shapes, such as the mirror shapes described in U.S. Pat. No. 7,110,156, and/or shown in U.S. Design Pat. Nos. D493,131 and/or D493,394, which are hereby incorporated herein by reference in their entireties.

Optionally, a reflective element assembly of the present invention (such as for an interior or exterior rearview mirror assembly) may include a photo sensor or light sensor (such as the types described in U.S. Pat. Nos. 6,831,268; 6,742,904; 6,737,629; 5,406,414; 5,253,109; 4,799,768; 4,793,690; and/ or 7,004,593, which are hereby incorporated herein by reference in their entireties) at the rear or fourth surface of the reflective element assembly, such that the photo sensor detects light passing through the reflective element assembly. Examples of such configurations are described in U.S. Pat. Nos. 4,793,690; 5,550,677; 5,193,029 and/or 7,004,593, which are all hereby incorporated herein by reference in their entireties. The reflective element assembly thus may have a window or transmissive port or portion at the photo sensor or, and preferably, may comprise a transflective display on demand (DOD) type reflective element assembly or cell, such as, for example, the types described in U.S. Pat. Nos. 5,668, 663; 5,724,187; 6,690,268; 7,195,381; 7,274,501; 7,255,451 and/or 7,184,190, which are all hereby incorporated herein by reference in their entireties. The transflective reflective element assembly may have a fixed attenuation such that only a relatively small amount of light passes therethrough, such as about 12 to 25 percent of the light incident on the reflective element assembly, such that the signal to dark current ratio generated at the sensor may be substantially reduced. Because the photo sensor may have a relatively small sensing area, the sensor may not receive or sense a substantial amount of light passing through the reflective element assembly. Therefore, it is envisioned that a light concentrator (such as a lens and/or light channel and/or light pipe and/or other light concentrating device) may be positioned at the photo sensor to focus or direct the light passing through a larger area of the reflective element assembly onto the smaller sensing area of the photo sensor.

Changes and modifications in the specifically described embodiments may be carried out without departing from the principles of the present invention, which is intended to be limited only by the scope of the appended claims, as interpreted according to the principles of patent law.

What is claimed is:

1. An exterior rearview mirror assembly for a vehicle, said exterior rearview mirror assembly comprising:
    a principal reflective element, wherein said principal reflective element comprises a generally planar glass substrate having a generally planar front surface and a generally planar rear surface;
    a principal mirror reflector at one of said front surface of said glass substrate of said principal reflective element and said rear surface of said glass substrate of said principal reflective element;
    a wide angle auxiliary reflective element, wherein said wide angle auxiliary reflective element comprises a substrate having a generally planar front surface and a curved rear surface;
    an auxiliary mirror reflector at said curved rear surface of said substrate of said wide angle auxiliary reflective element;
    a back plate formed by injection molding, said back plate comprising a principal reflective element region and an auxiliary reflective element region;
    wherein said principal reflective element is disposed at said principal reflective element region of said back plate;
    wherein said principal reflective element has a cutout at a corner region thereof;
    wherein said wide angle auxiliary reflective element is disposed at said auxiliary reflective element region of said back plate and is adjacent to said principal reflective element at said corner region of said principal reflective element, and wherein said generally planar front surface of said substrate of said wide angle auxiliary reflective element is generally coplanar with said generally planar front surface of said glass substrate of said principal reflective element;
    a single heater pad disposed between said principal reflective element and said principal reflective element region of said back plate and between said wide angle auxiliary reflective element and said auxiliary reflective element region of said back plate;
    wherein, when powered, said single heater pad heats said principal reflective element and said wide angle auxiliary reflective element; and
    wherein, when powered, said single heater pad provides enhanced heating at said wide angle auxiliary reflective element as compared to heating at said principal reflective element.

2. The exterior rearview mirror assembly of claim 1, wherein said generally planar rear surface of said glass substrate of said principal reflective element is adhesively attached at said single heater pad and wherein said single heater pad is adhesively attached at said principal reflective element region of said back plate.

3. The exterior rearview mirror assembly of claim 1, comprising a demarcation between a perimeter edge of said wide angle auxiliary reflective element and a perimeter edge of said principal reflective element at said cutout.

4. The exterior rearview mirror assembly of claim 3, wherein said demarcation comprises a demarcating element disposed between said wide angle auxiliary reflective element and said principal reflective element.

5. The exterior rearview mirror assembly of claim 4, wherein said demarcating element comprises a first groove that receives said perimeter edge of said principal reflective element and a second groove that receives said perimeter edge of said wide angle auxiliary reflective element, and wherein, with said perimeter edges received by said first and second grooves, respectively, a portion of said demarcating element overlaps a portion said generally planar front surfaces of said principal reflective element and said wide angle auxiliary reflective element at or near said perimeter edges.

6. The exterior rearview mirror assembly of claim 5, wherein said demarcation element comprises a molded plastic element.

7. The exterior rearview mirror assembly of claim 4, wherein said demarcation element comprises a dark polymeric material.

8. The exterior rearview mirror assembly of claim 1, wherein said back plate comprises a perimeter lip that forms a pocket that at least partially receives said principal reflective element and said wide angle auxiliary reflective element.

9. The exterior rearview mirror assembly of claim 8, wherein said perimeter lip of said back plate frames said principal reflective element and said wide angle auxiliary reflective element.

10. The exterior rearview mirror assembly of claim 1, wherein said single heater pad comprises electrical contacts that protrude at least partially through at least one aperture through said back plate for electrical connection of said electrical contacts to an electrical connector, and wherein, with said electrical connector electrically connected to an electrical power source of a vehicle equipped with said exterior rearview mirror assembly and powered, said single heater pad heats said principal reflective element and said wide angle auxiliary reflective element.

11. The exterior rearview mirror assembly of claim 1, wherein, with said wide angle auxiliary reflective element disposed at said auxiliary reflective element region of said back plate, a gap exists between said curved rear surface of said wide angle auxiliary reflective element and said heater pad.

12. The exterior rearview mirror assembly of claim 11, wherein said gap is at least partially filled with a heat conductive material disposed between said single heater pad and said curved rear surface of said wide angle auxiliary reflective element.

13. The exterior rearview mirror assembly of claim 1, wherein said substrate of said wide angle auxiliary reflective element comprises glass.

14. An exterior rearview mirror assembly for a vehicle, said exterior rearview mirror assembly comprising:
- a principal reflective element, wherein said principal reflective element comprises a generally planar glass substrate having a generally planar front surface and a generally planar rear surface;
- a principal mirror reflector at one of said front surface of said glass substrate of said principal reflective element and said rear surface of said glass substrate of said principal reflective element;
- a wide angle auxiliary reflective element, wherein said wide angle auxiliary reflective element comprises a glass substrate having a generally planar front surface and a curved rear surface;
- an auxiliary mirror reflector at said curved rear surface of said substrate of said wide angle auxiliary reflective element;
- a back plate formed by injection molding, said back plate comprising a principal reflective element region and an auxiliary reflective element region;
- wherein said principal reflective element is disposed at said principal reflective element region of said back plate;
- wherein said principal reflective element has a cutout at a corner region thereof;
- wherein said wide angle auxiliary reflective element is disposed at said auxiliary reflective element region of said back plate and is adjacent to said principal reflective element at said corner region of said principal reflective element, and wherein said generally planar front surface of said substrate of said wide angle auxiliary reflective element is generally coplanar with said generally planar front surface of said glass substrate of said principal reflective element;
- a single heater pad disposed between said principal reflective element and said principal reflective element region of said back plate and between said wide angle auxiliary reflective element and said auxiliary reflective element region of said back plate;
- wherein said single heater pad comprises electrical contacts that protrude at least partially through at least one aperture through said back plate for electrical connection of said electrical contacts to an electrical connector, and wherein, with said electrical connector electrically connected to an electrical power source of a vehicle equipped with said exterior rearview mirror assembly and powered, said single heater pad heats said principal reflective element and said wide angle auxiliary reflective element; and
- wherein, when powered, said single heater pad provides enhanced heating at said wide angle auxiliary reflective element as compared to heating at said principal reflective element.

15. The exterior rearview mirror assembly of claim 14, comprising a demarcation between a perimeter edge of said wide angle auxiliary reflective element and a perimeter edge of said principal reflective element at said cutout, wherein said demarcation comprises a demarcating element disposed between said wide angle auxiliary reflective element and said principal reflective element, and wherein said demarcating element comprises a first groove that receives said perimeter edge of said principal reflective element and a second groove that receives said perimeter edge of said wide angle auxiliary reflective element, and wherein, with said perimeter edges received by said first and second grooves, respectively, a portion of said demarcating element overlaps a portion said generally planar front surfaces of said principal reflective element and said wide angle auxiliary reflective element at or near said perimeter edges, and wherein said demarcation element comprises a molded plastic element.

16. The exterior rearview mirror assembly of claim 14, wherein, with said wide angle auxiliary reflective element disposed at said auxiliary reflective element region of said back plate, a gap exists between said curved rear surface of said wide angle auxiliary reflective element and said heater pad.

17. The exterior rearview mirror assembly of claim 16, wherein said gap is at least partially filled with a heat conductive material disposed between said single heater pad and said curved rear surface of said wide angle auxiliary reflective element.

18. An exterior rearview mirror assembly for a vehicle, said exterior rearview mirror assembly comprising:
- a principal reflective element, wherein said principal reflective element comprises a generally planar glass substrate having a generally planar front surface and a generally planar rear surface;
- a principal mirror reflector at one of said front surface of said glass substrate of said principal reflective element and said rear surface of said glass substrate of said principal reflective element;
- a wide angle auxiliary reflective element, wherein said wide angle auxiliary reflective element comprises a glass substrate having a generally planar front surface and a curved rear surface;
- an auxiliary mirror reflector at said curved rear surface of said substrate of said wide angle auxiliary reflective element;
- a back plate formed by injection molding, said back plate comprising a principal reflective element region and an auxiliary reflective element region;
- wherein said principal reflective element is disposed at said principal reflective element region of said back plate;
- wherein said principal reflective element has a cutout at a corner region thereof;
- wherein said wide angle auxiliary reflective element is disposed at said auxiliary reflective element region of said back plate and is adjacent to said principal reflective element at said corner region of said principal reflective element, and wherein said generally planar front surface of said substrate of said wide angle auxiliary reflective element is generally coplanar with said generally planar front surface of said glass substrate of said principal reflective element;
- a demarcation between a perimeter edge of said wide angle auxiliary reflective element and a perimeter edge of said principal reflective element at said cutout;
- a single heater pad disposed between said principal reflective element and said principal reflective element region of said back plate and between said wide angle auxiliary reflective element and said auxiliary reflective element region of said back plate;
- wherein, when powered, said single heater pad heats said principal reflective element and said wide angle auxiliary reflective element; and
- wherein, when powered, said single heater pad provides enhanced heating at said wide angle auxiliary reflective element as compared to heating at said principal reflective element.

19. The exterior rearview mirror assembly of claim 18, wherein said demarcation comprises a demarcating element disposed between said wide angle auxiliary reflective element and said principal reflective element, and wherein said demarcating element comprises a first groove that receives said perimeter edge of said principal reflective element and a second groove that receives said perimeter edge of said wide angle auxiliary reflective element, and wherein, with said perimeter edges received by said first and second grooves, respectively, a portion of said demarcating element overlaps a portion said generally planar front surfaces of said principal reflective element and said wide angle auxiliary reflective element at or near said perimeter edges, and wherein said demarcation element comprises a molded plastic element.

20. The exterior rearview mirror assembly of claim 18, wherein, with said wide angle auxiliary reflective element disposed at said auxiliary reflective element region of said back plate, a gap exists between said curved rear surface of said wide angle auxiliary reflective element and said heater pad, and wherein said gap is at least partially filled with a heat conductive material disposed between said single heater pad and said curved rear surface of said wide angle auxiliary reflective element.

* * * * *